US012663969B2

(12) United States Patent
Liu et al.

(10) Patent No.: US 12,663,969 B2
(45) Date of Patent: Jun. 23, 2026

(54) METHOD FOR COMPUTING DATA DEPENDENCE RELATIONSHIP IN PROGRAM, AND COMPUTER READABLE STORAGE MEDIUM

(71) Applicant: Cambricon (Xi'an) Semiconductor Co., Ltd., Xi'an (CN)

(72) Inventors: Yanna Liu, Xi'an (CN); Zhenyu Su, Xi'an (CN)

(73) Assignee: CAMBRICON (XI'AN) SEMICONDUCTOR CO., LTD., Xi'an City (CN)

( * ) Notice: Subject to any disclaimer, the term of this patent is extended or adjusted under 35 U.S.C. 154(b) by 311 days.

(21) Appl. No.: 18/000,120

(22) PCT Filed: May 27, 2021

(86) PCT No.: PCT/CN2021/096378
§ 371 (c)(1),
(2) Date: Nov. 28, 2022

(87) PCT Pub. No.: WO2021/239056
PCT Pub. Date: Dec. 2, 2021

(65) Prior Publication Data
US 2023/0195599 A1     Jun. 22, 2023

(30) Foreign Application Priority Data

May 29, 2020     (CN) .......................... 202010474869.5

(51) Int. Cl.
G06F 8/41          (2018.01)
G06F 11/362     (2025.01)

(52) U.S. Cl.
CPC ................ G06F 8/433 (2013.01); G06F 8/41 (2013.01); G06F 8/443 (2013.01); G06F 11/3636 (2013.01)

(58) Field of Classification Search
CPC .............................. G06F 11/3636; F06F 8/41
See application file for complete search history.

(56) References Cited

U.S. PATENT DOCUMENTS 6,026,241 A * 2/2000 Chow .................... G06F 8/443
717/152
6,301,704 B1 10/2001 Chow et al.
(Continued)

FOREIGN PATENT DOCUMENTS

CN          109324827 A          2/2019
CN          110168548 A          8/2019
(Continued)

OTHER PUBLICATIONS

"LLVM Concepts"—llvmpy 0.9.0 documentation » User Guide, Retrieved online from [https://www.llvmpy.org/llvmpy-doc/dev/doc/llvm_concepts.html#:~:text=A%20consequence%20of%20single%20assignment,cannot%20be%20determined%20statically], published online before 2012, pp. 1-4 (Year: 2012).*
(Continued)

*Primary Examiner* — Geoffrey R St Leger
(74) *Attorney, Agent, or Firm* — Getech Law LLC; Jun Ye

(57) ABSTRACT

The present disclosure relates to a method for computing data dependence relationships in a program and a computer readable storage medium, which are applied to a computing apparatus. The computing apparatus is included in an integrated circuit apparatus. The integrated circuit apparatus includes a general interconnection interface and other processing apparatus. The computing apparatus interacts with other processing apparatus to jointly complete a computing operation specified by a user. The integrated circuit apparatus further includes a storage apparatus. The storage apparatus is connected to the computing apparatus and other
(Continued)

processing apparatus, respectively. The storage apparatus is used for data storage of the computing apparatus and other processing apparatus.

15 Claims, 11 Drawing Sheets

(56) References Cited

U.S. PATENT DOCUMENTS

| | | | |
|---|---|---|---|
| 6,618,767 B1 * | 9/2003 | Slaughter | G06F 9/45537 |
| | | | 719/321 |
| 2004/0003088 A1 * | 1/2004 | Ng | G06F 9/5016 |
| | | | 709/226 |
| 2010/0083240 A1 * | 4/2010 | Siman | G06F 16/245 |
| | | | 717/144 |
| 2019/0042218 A1 * | 2/2019 | Zhang | G06F 8/44 |

FOREIGN PATENT DOCUMENTS

| | | |
|---|---|---|
| CN | 110633248 A | 12/2019 |
| CN | 111857815 A | 10/2020 |

OTHER PUBLICATIONS

Michel Schinz, SSA form, Advanced Complier Construction, 7 pages (Year: 2008).*
Chen, "Compiler Principles", Higher Education Press, Sep. 30, 2003, 6 pages.
CN2020104748695—First Office Action mailed on Oct. 22, 2024, 68 pages.
Hu, "Compilation Principles Tutor", Xi'an Electronic Science and Technology University Press, Aug. 31, 2001, 4 pages.
Ma, Hongtu et al., "Analysis and Implementation of the Computation of Dominator in CFG", Computer Science, vol. 36, No. 3, Mar. 31, 2009, 5 pages.
PCT/CN2021/096378—International Search Report and Written Opinion, mailed on Aug. 27, 2021, 15 pages.

* cited by examiner

```
x=input();
if (x==42)

then
    y1=1;
else
    y2=x+2;
end
y3= Φ(y1, y2);
print(y3);
```

301 Construct a program into a control flow graph in a static single assignment form 302 Identify immediate dominators of all nodes 303 Set initial information of memory descriptors of all nodes 304 Compute and update define information and kill set information of a memory descriptor of each node

METHOD FOR COMPUTING DATA DEPENDENCE RELATIONSHIP IN PROGRAM, AND COMPUTER READABLE STORAGE MEDIUM

CROSS REFERENCE OF RELATED APPLICATION

This is a 371 of International Application No. PCT/CN2021/096378, filed May 27, 2021, which claims priority to Chinese Patent Application No. 202010474869.5 with the title of "Method for Computing Data Dependence Relationship in Program, and Computer Readable Storage Medium" filed on May 29, 2020, the contents of which are incorporated herein by reference in their entirety.

TECHNICAL FIELD

The present disclosure generally relates to a computer field. More specifically, the present disclosure relates to a method for computing data dependence relationships in a program and a computer readable storage medium.

BACKGROUND

Exact data flow analysis is the basis for efficient compilation optimization. A static single assignment (SSA) form is an efficient data flow analysis technique and may be applied to almost all modern compilers currently. The SSA form is a kind of intermediate representation (IR). Under the SSA form, each variable is assigned only once, which makes a use-define chain of the variable very explicit and helps simplify algorithms of compilers.

When one memory area is likely defined by a plurality of instructions, based on the existing technology, it is difficult to analyze data dependence relationships between the instructions, which makes a compilation process unable to be simplified effectively, resulting in a waste of computing resources. Therefore, it is urgently required for a new method to analyze data dependence relationships between memories.

SUMMARY

In order to at least partly solve technical problems mentioned in BACKGROUND, a solution of the present disclosure provides a method for computing data dependence relationships in a program and a computer readable storage medium.

One aspect of the present disclosure discloses a method for computing data dependence relationships in a program. The method includes: constructing the program into a control flow graph in a static single assignment form, where the control flow graph includes a plurality of nodes; setting initial information of memory descriptors of the plurality of nodes, where the initial information includes define information and kill set information of all memory descriptors of immediate dominators; and iterating based on the control flow graph, where each iteration performs following steps: traversing the plurality of nodes, computing and updating define information and kill set information of a memory descriptor of each node, and updating data dependence relationships of instructions. The data dependence relationships of the instructions are used as reference information for instruction compilation optimization.

Another aspect of the present disclosure discloses a computer readable storage medium, on which computer program codes for computing data dependence relationships in a program are stored. When the computer program codes are run by a processor, the method is performed.

In this present disclosure, a compiler analyzes a memory area defined by each instruction or intermediate representation and a memory area used by each instruction or intermediate representation and computes data dependence relationships between instructions. Simultaneously, the present disclosure creates a define-use chain and a use-define chain for an instruction that has define-use relationships, so as to simplify data dependence relationships between memories and accelerate computing of image, speech, and text data.

BRIEF DESCRIPTION OF DRAWINGS

By reading the following detailed description with reference to drawings, the above-mentioned and other objects, features and technical effects of exemplary implementations of the present disclosure will become easier to understand. In the drawings, several implementations of the present disclosure are shown in an exemplary rather than restrictive manner, and the same or corresponding reference numerals indicate the same or corresponding parts.

DETAILED DESCRIPTION

Figure 1A:
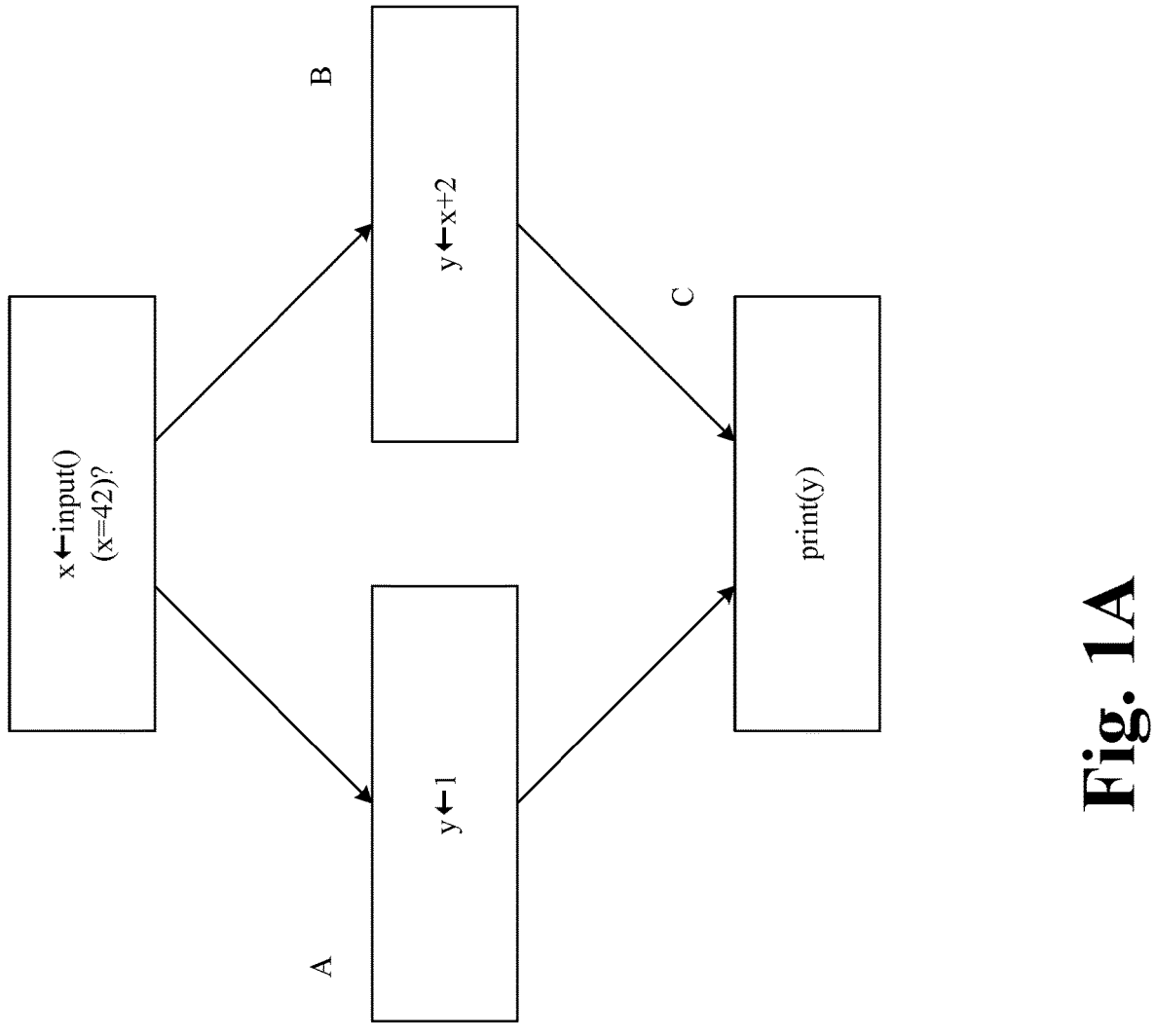
FIG. 1A shows an exemplary source code and an exemplary control flow graph.

Technical solutions in embodiments of the present disclosure will be described clearly and completely hereinafter with reference to drawings in the embodiments of the present disclosure. Obviously, embodiments to be described are merely some of, but not all of the embodiments of the present disclosure. All other embodiments obtained by those skilled in the art based on the embodiments of the present disclosure without creative efforts shall fall within the scope of protection of the present disclosure.

It should be understood that terms such as "first", "second", "third", and "fourth" in the claims, the specification, and the drawings of the present disclosure are used for distinguishing different objects rather than describing a specific order. Terms such as "including" and "comprising" used in the specification and the claims of the present disclosure indicate the presence of a feature, an entity, a step, an operation, an element, and/or a component, but do not exclude the existence or addition of one or more other features, entities, steps, operations, elements, components, and/or collections thereof.

It should also be understood that terms used in the specification of the present disclosure are merely for a purpose of describing a particular embodiment rather than limiting the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims of the present disclosure refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context.

Specific implementations of the present disclosure will be described in detail in combination with the drawings below.

The present disclosure provides a control flow graph using a static single assignment form. In this present disclosure, a compiler analyzes a memory area defined by each instruction or intermediate representation and a memory area used by each instruction or intermediate representation and computes data dependence relationships between instructions. For an instruction that has define-use relationships, the present disclosure creates a define-use chain and a use-define chain.

The control flow graph is an abstract data structure used in the compiler. The control flow graph represents all paths that a program may traverse during an execution process and reflects possible flow directions of all basic blocks (BB) during the process in the form of a flowchart. The control flow graph is composed of relationships between nodes. A node is a basic block and is a statement sequence that is executed sequentially to the maximum extent in the program. Each basic block has only one entrance and one exit. When the basic block is executed, the basic block starts at the entrance and ends at the exit. The characteristic of the basic block is that, as long as a first instruction in the basic block is executed, all instructions in the basic block will be executed in order until all instructions in the basic block are executed.

The static single assignment form is mainly used to enable each variable to be assigned only once by adjusting variables, so as to achieve better operation efficiency. For example, for the following three rows of codes:

$$y := 1$$

$$y := 2$$

$$x := y.$$

In a first row, 1 is assigned to a variable y; in a second row, 2 is assigned to the variable y; and in a third row, a value of the variable y is assigned to a variable x. Since the variable y is assigned again in the second row, which means that the assignment of the variable y in the first row is overwritten, and the value of the variable y is used in the third row, the first row is unnecessary. In the static single assignment form, the codes are converted into the following intermediate representations:

$$y_1 := 1$$

$$y_2 := 2$$

$$x_1 := y_2.$$

Figure 1B:
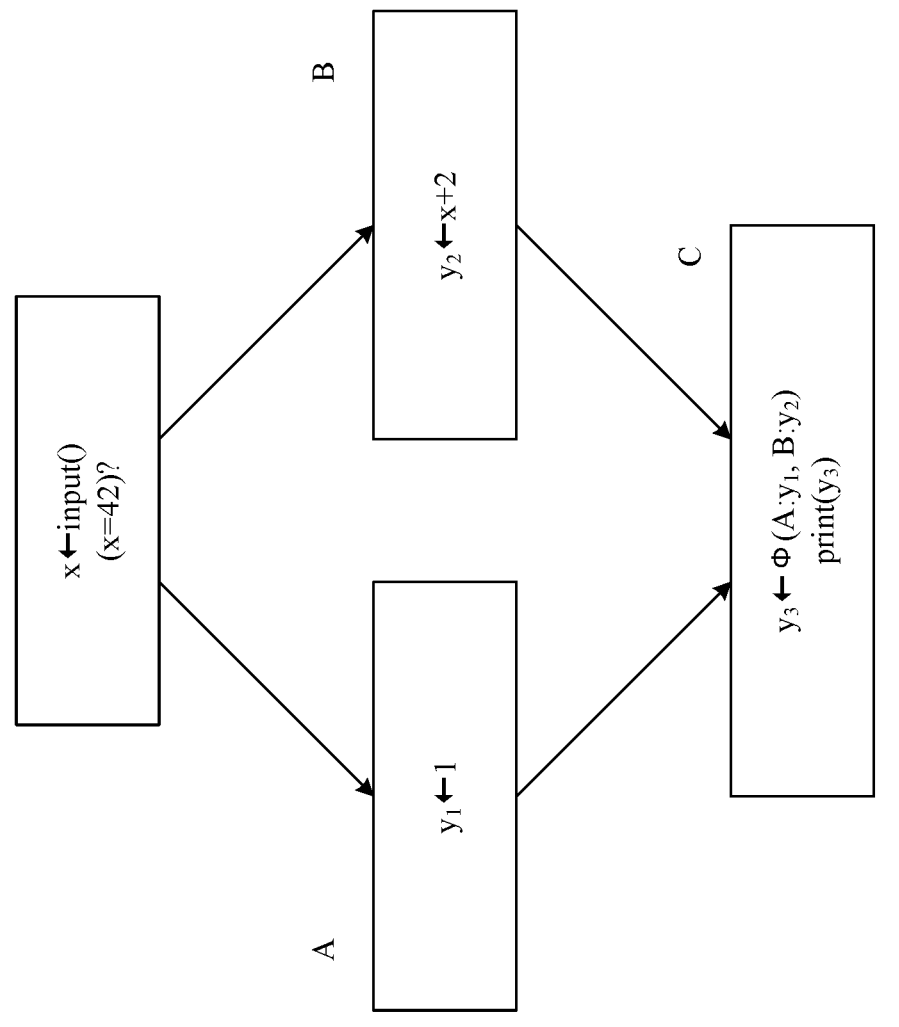
FIG. 1B shows an equivalent static single assignment form and an equivalent control flow graph.

Taking FIG. 1 as an example, FIG. 1A shows an exemplary source code and an exemplary control flow graph. First, a value of input data is assigned to a variable x. Next, whether a value of the variable x is 42 is judged. If the value of the variable x is 42, 1 is assigned to a variable y. If the value of the variable x is not 42, the variable y is predicated with x+2. Finally, a value of the variable y is printed. FIG. 1B shows an equivalent static single assignment form and an equivalent control flow graph. The variable y is rewritten as $y_1$ and $y_2$ in two branches. At an intersection of control flows, the static single assignment form merges values of $y_1$ and $y_2$ from different branches by using a 0 (PHI) function, which means that one of the values of $y_1$ and $y_2$ will be obtained. Next, the value is assigned to $y_3$. Finally, a value of $y_3$ is printed. It may be shown from FIG. 1B that the static single assignment form may adjust each variable in the source code, so as to enable one variable to be assigned only once.

The characteristics of the static single assignment form include followings: a source variable is split by range of activity (from one define of the variable to one use of the variable), and new variables with numerical symbol suffixes are generated; each new variable is defined only once, and for example, the variable y is adjusted to $y_1$ and $y_2$; and at the intersection of control flows, the PHI function merges values from different paths. The PHI function represents a parallel operation, which means selecting one assignment based on running paths.

The static single assignment form simplifies two types of chain relationships: a use-define chain (use-def chain) and a define-use chain (def-use chain). The use-define chain is a data structure, which includes one define (or called definition) variable and a collection of all memory descriptors used by the define variable. Relatively, the define-use chain includes one use variable and a collection of all memory descriptors defined by the use variable. Since a variable that is in a non-static single assignment form is defined more than once, the define-use chain of each variable is very complicated. However, in the static single assignment form, there is no variable with the same name, and each variable is defined only once. Therefore, memory descriptors used by the variable with the same name belong to the define-use chain of the variable. Moreover, each variable is defined only once before use, and therefore, the use-define chain is one-to-one. It may be known from the above that both the use-define chain and the define-use chain are simplified in the static single assignment form.

The static single assignment form offers following benefits: for a scalar: each variable has a unique define, and data flow analysis and algorithm optimization are simpler; memory space occupied by the use-define chain is decreased from exponential growth to linear growth; a relationship between the use and the define is more intuitive; several unrelated memory descriptors used by the same variable in a source program may be translated into memory descriptors used by different variables in the static single assignment form, thereby avoiding the execution of unnecessary redundant instructions.

For a tensor: each variable may be defined by a memory descriptor, and the memory descriptor is used to describe a memory area, which includes three kinds of information, including variable name, offset, and size. For example, MD1 (var: A, offset: 0, size: 128) represents that a memory descriptor numbered 1 specifies data of a variable A, and the data is stored in address space [0:127] of 128 consecutive addresses starting from an address whose offset is 0.

If MD2 (var: A, offset: 32, size: 32) exists, obviously, MD2 and MD1 overlap in a memory area [32, 63]. Then, when an instruction defines MD1, simultaneously, the instruction may also affect a memory area corresponding to MD2. Then, the define of MD1 by the instruction is a must define, while the define of other memory descriptors (such as MD2) that intersect with MD1 by the instruction is a may define. Similarly, there are similar definitions for a memory descriptor used by the instruction, which include a must use and a may use, respectively. In other words, "must" refers to a necessary description of an area, while "may" refers to any other area that intersects with "must".

Moreover, if an offset and a size of a memory descriptor are exact values or ranges, the memory descriptor is "exact"; otherwise, the memory descriptor is not exact. For example, MD3 [0, 127] is exact, and MD4 [32, X] is not exact (where X is unknown).

Additionally, still taking MD1 and MD2 as examples, if the define of MD2 is earlier than the define of MD1, so whatever the define of MD2 is, the define of MD2 may be "killed" by the later MD1; in other words, the define of MD2 may be overwritten by the later MD1. If the define of MD2 is later than the define of MD1, then, the define of MD2 may kill part of the define area of MD1, which is [32, 63]. Such killed area information is called kill set information. In other words, a kill set of a memory descriptor records an area that may be killed by other instructions, and the define of the memory descriptor is not valid for the area.

Figure 2:
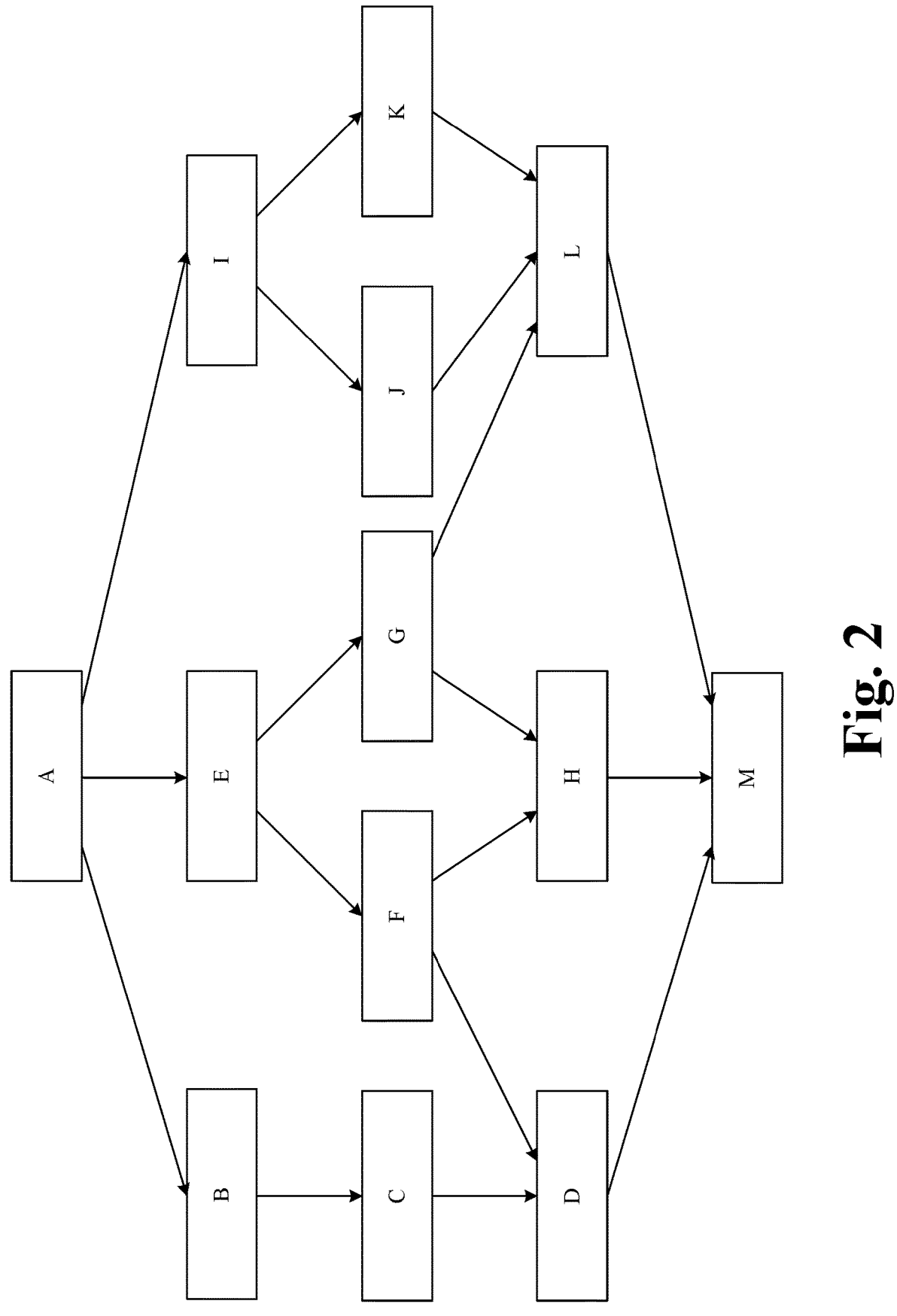
FIG. 2 shows an exemplary control flow graph.

There are so-called dominators, strict dominators, and immediate dominators in the control flow graph. FIG. 2 shows an exemplary control flow graph to illustrate these nodes. Taking a node H as an example, a starting point of a path is a node A, and then the path goes through a node E. After the node E, there are branches, and the path may go to a node F or a node G. No matter the path goes to the node F or the node G, the path will go through the node H at the end. A dominator refers to a basic block that the path must go through when the path goes to a particular basic block starting with the starting point of the control flow graph. For example, in order to go to the node H, the path must go through the node A, the node E, and the node H itself, and therefore, the node A, the node E, and the node H are dominators of the node H. A strict dominator refers to a dominator other than the particular basic block itself. Similarly, taking the node H as an example, the node A and the node E are strict dominators of the node H. An immediate dominator refers to a dominator closest to the particular basic block. For example, the node E is an immediate dominator of the node H.

In the process of constructing the static single assignment form, a dominance frontier is required to be considered. The dominance frontier refers to a position where dominance relationships of a certain node end and a position where other control flows emerge. The dominance frontier may be intuitively understood as a frontier (excluding the frontier itself) that a particular node may dominate. Taking the node E in FIG. 2 as an example, the node E strictly dominates the node F, the node G, and the node H, and then, dominance frontiers of the node E are a node D (which is an immediate successor node of the node F), a node M (which is an immediate successor node of the node H), a node L (which is an immediate successor node of the node G). As shown in the figure, the node D, the node M, and the node L all have other branches imported, so that the node D, the node M, and the node L are not dominated by the node E.

Figure 3:
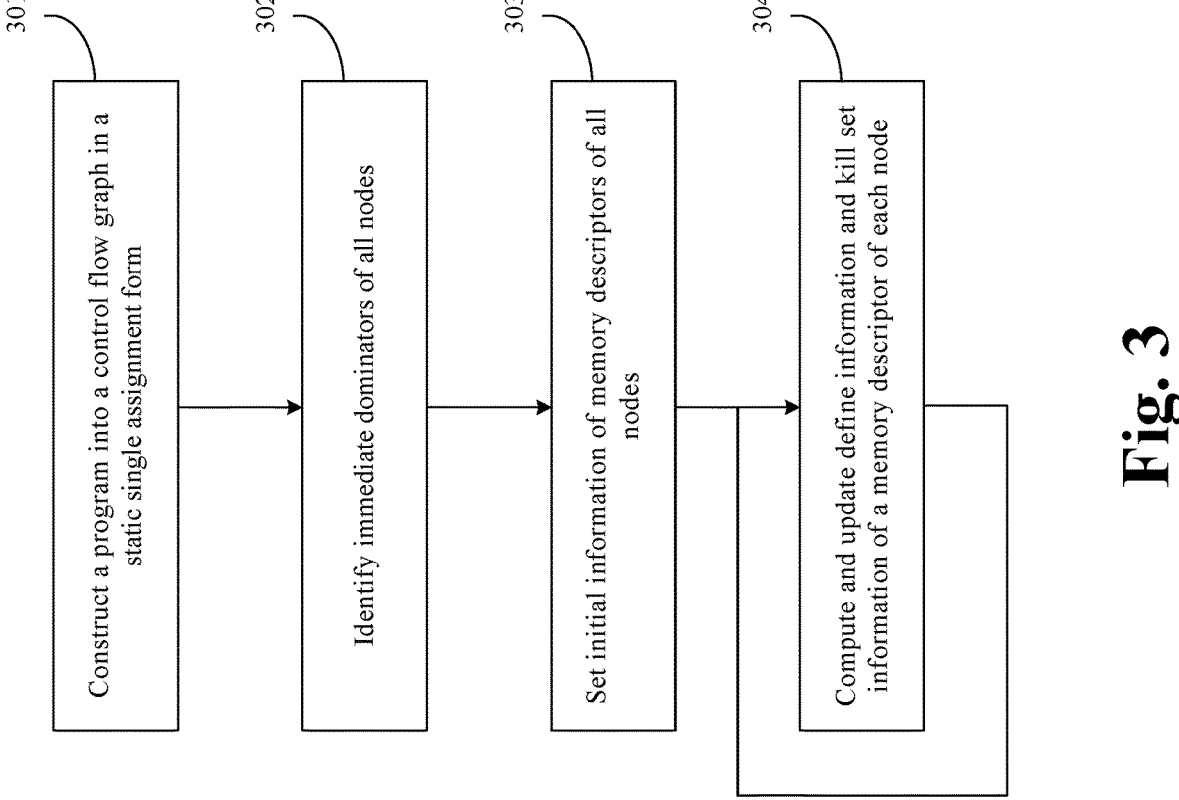
FIG. 3 is a flowchart according to an embodiment of the present disclosure.

An embodiment of the present disclosure shows a method for computing data dependence relationships in a program in a control flow graph. In the environment where tensor instructions are applicable, the program may be used for inference computing or other operations of image, speech, and text data in a neural network, which is not limited herein. For a case where tensor instructions are included, a tensor memory area may be defined by a plurality of instructions. The method of the embodiment of the present disclosure is used to analyze data dependence relationships between instructions according to memory descriptors. FIG. 3 is a flowchart of this embodiment.

In a step 301, a program is constructed into a control flow graph in a static single assignment form. There are many ways to convert the program into the static single assignment form. The simplest way is to replace each assigned variable with a new variable name. For example, the variable y of the basic block A and the basic block B in the source program shown in FIG. 1A may be changed to the variable $y_1$ of the basic block A and the variable $y_2$ of the basic block B in FIG. 1B.

However, the use of the variable y in the basic block C in FIG. 1A may not be determined because predecessor basic blocks (including the basic block A and the basic block B) define the variable y and there is no way to know from which predecessor basic block the program will reach the basic block C when compiling. When the control flow graph encounters this situation, this step then adds a PHI function. As shown in FIG. 1B, a PHI function instruction is added at the beginning of the basic block C, and at the same time, a variable $y_3$ is redefined based on the variable y. The PHI function may select a corresponding version according to the running path of the program; in other words, the PHI function may choose to use the variable $y_1$ or the variable $y_2$.

In this embodiment, through dominance frontiers, what basic blocks the PHI function should be placed in may be known exactly. If a certain node defines a certain variable, then, this variable may reach each node that is dominated by this node, and it is required to add the PHI function to immediate successor basic blocks.

This embodiment implements the PHI function by using a following way. Still taking FIG. 1B as an example, assuming that $y_1$ of the basic block A is allocated to a cache $R_1$ and $y_2$ of the basic block B is allocated to a cache $R_2$, then, a PHI function $y_3 \leftarrow \Phi$ (A:$y_1$, B:$y_2$) in the basic block C may generate a following instruction at the end of the basic block A:

move $R_3 \leftarrow R_1$.

In other words, data of the cache $R_1$ is moved to a cache $R_3$. Similarly, the PHI function may generate a following instruction at the end of the basic block B:

move $R_3 \leftarrow R_2$.

Data of the cache $R_2$ is moved to the cache $R_3$. As such, no matter the program goes through the basic block A or the basic block B, the cache $R_3$ may be a true define of the variable $y_3$.

In a step 302, immediate dominators of all nodes are identified. This step may identify the immediate dominators by adopting a typical Lengauer-Tarjan algorithm or other algorithms. Taking a control flow graph in FIG. 2 as an example, this embodiment identifies that the immediate dominators include a node A, a node B, a node E, and a node I.

In a step 303, initial information of all nodes are set, where the initial information includes define information and kill set information of all memory descriptors of corresponding immediate dominators. Since each variable in the immediate dominators may be used in successor basic blocks directly, when this embodiment sets the initial information, the define and kill set of each variable in the immediate dominators may be used as initial information of the successor basic blocks. Moreover, a variable is defined by a memory descriptor, and therefore, setting initial information of all nodes is to set initial information of each variable in the nodes. In other words, setting initial information of all nodes is to set initial information of define information and kill set information of a memory descriptor corresponding to the variable.

Taking a node C in FIG. 2 as an example, an immediate dominator of the node C is the node B, and therefore, define information and kill set information of a memory descriptor of a variable in the node B may be used as initial information of define information and kill set information of a memory descriptor of a variable in the node C. Still taking a node L in FIG. 2 as an example, an immediate dominator of the node L is the node A, and therefore, define information and kill set information of a memory descriptor of a variable in the node A may be used as initial information of define information and kill set information of a memory descriptor of a variable in the node L.

In this embodiment, the kill set information is an ordered list. The list is usually arranged in an order from a low address to a high address, so as to perform various intersection and union operations.

In a step 304, iterations are performed based on the control flow graph. In each iteration, all nodes are traversed, define information and kill set information of a memory descriptor of each node are computed and updated, and data dependence relationships of instructions are updated. Initialization is to compute the define information and the kill set information of the memory descriptor of each node based on the initial information obtained in the step 303 and after obtaining new define information and new kill set information, use the new define information and the new kill set information to compute again. Such an iteration is repeated until the define information and the kill set information of the memory descriptor of the variable in each node are no longer changed.

In the process of iteration, an order of data flows may be a preorder, an inorder, a postorder, or a reverse postorder. Taking the postorder as an example, operations of the postorder include traversing a left subtree in a reverse order, then traversing a right subtree in the reverse order, and finally accessing a root node. Taking FIG. 2 as an example, a result of postorder traversal is M→D→C→B→H→F→G→E→L→J→K→I→A. Then, taking the reverse postorder as an example, operations of the reverse postorder include traversing in the postorder first and then reversing a result. Therefore, a result of reverse postorder traversal of the control flow graph of FIG. 2 is A→I→K→J→L→E→G→F→H→B→C→D→M. The reverse postorder may converge earlier. This embodiment does not limit an order of traversal, but the reverse postorder traversal is preferred.

When the define information and the kill set information of the memory descriptor of the variable of each node are no longer changed, the iterations may end. At this time, the define-use chain, the use-define chain, and the kill set information are final results. Specifically, updating the define information and the kill set information of each memory descriptor is to update data dependence relationships between instructions. These data dependence relationships are used as reference information for instruction compilation optimization. Instructions after compilation optimization may be compiled into machine codes that are executable by a computer, so as to enable the computer to perform computing of image, speech, text data, and the like, according to data dependence relationships of these instructions. The instruction compilation optimization includes but is not limited to dead code deletion, common sub-expression deletion, and constant folding, and the like.

Considering that nodes may involve the PHI function, this embodiment may further traverse an instruction of each basic block in this step and judge whether a successor basic block of each basic block is a PHI node. If the successor basic block is the PHI node, define information of all immediate predecessor nodes of the PHI node is set as define information of a memory descriptor of the PHI node, so as to determine the define information of the PHI node. Next, intersection is taken for kill set information of these immediate predecessor nodes to generate an intersection area of the kill set information of the immediate predecessor nodes. Then, the intersection area is set as kill set information of the memory descriptor of the PHI node, so as to determine the kill set information of the PHI node.

The define way of the PHI function will be explained by using an example. It is assumed that the PHI node has two branch inputs, and these two immediate predecessor nodes have instructions to define a memory descriptor MD1, respectively, which are MD1V1 and MD1V2. It is further assumed that record information of MD1V1 and MD1V2 is as follows:

| | Define information | Kill set information |
|---|---|---|
| MD1V1 | IR1, IR2 | {[1, 127]} |
| MD1V2 | IR3, IR4 | {[32, 63]} |

It is assumed that the define information of all immediate predecessor nodes of the PHI node is the define information of the memory descriptor of the PHI node, which includes IR1, IR2, IR3, and IR4. Next, intersection is taken for the kill set information of these immediate predecessor nodes to generate the intersection area of the kill set information of the immediate predecessor nodes. For example, an intersection area between [1, 127] and [32, 63] is [32, 63], and therefore, the kill set information of the memory descriptor of the PHI node is [32, 63].

| | Define information | Kill set information |
|---|---|---|
| Memory descriptor of PHI node | IR1, IR2 IR3, IR4 | {[32, 63]} |

In the step 304 of the embodiment, generally, a memory descriptor used by an instruction is identified first, and then a memory descriptor defined by the instruction is identified. More specifically, the embodiment identifies which memory descriptors are used by instructions in each node and which memory descriptors are defined by the instructions in each node first. Next, the embodiment computes and updates define information and kill set information of the memory descriptors used by those instructions. Then, the embodiment computes and updates define information and kill set information of the memory descriptors defined by those instructions.

For example, for an addition instruction C[0, 127]=A[0, 127]+B[0, 127], this addition instruction defines MD1 (var: C, offset: 0, size: 128), and this addition instruction uses MD2 (var: A, offset: 0, size: 128) and MD3 (var: B, offset: 0, size: 128). In an embodiment of the present disclosure, when define information and kill set information of a memory descriptor of each node are computed and updated, define information and kill set information of memory descriptors (including MD2 and MD3) used by this addition instruction may be computed and updated first. Then, define information and kill set information of a memory descriptor MD1 defined by this addition instruction may be computed and updated.

Figure 4:
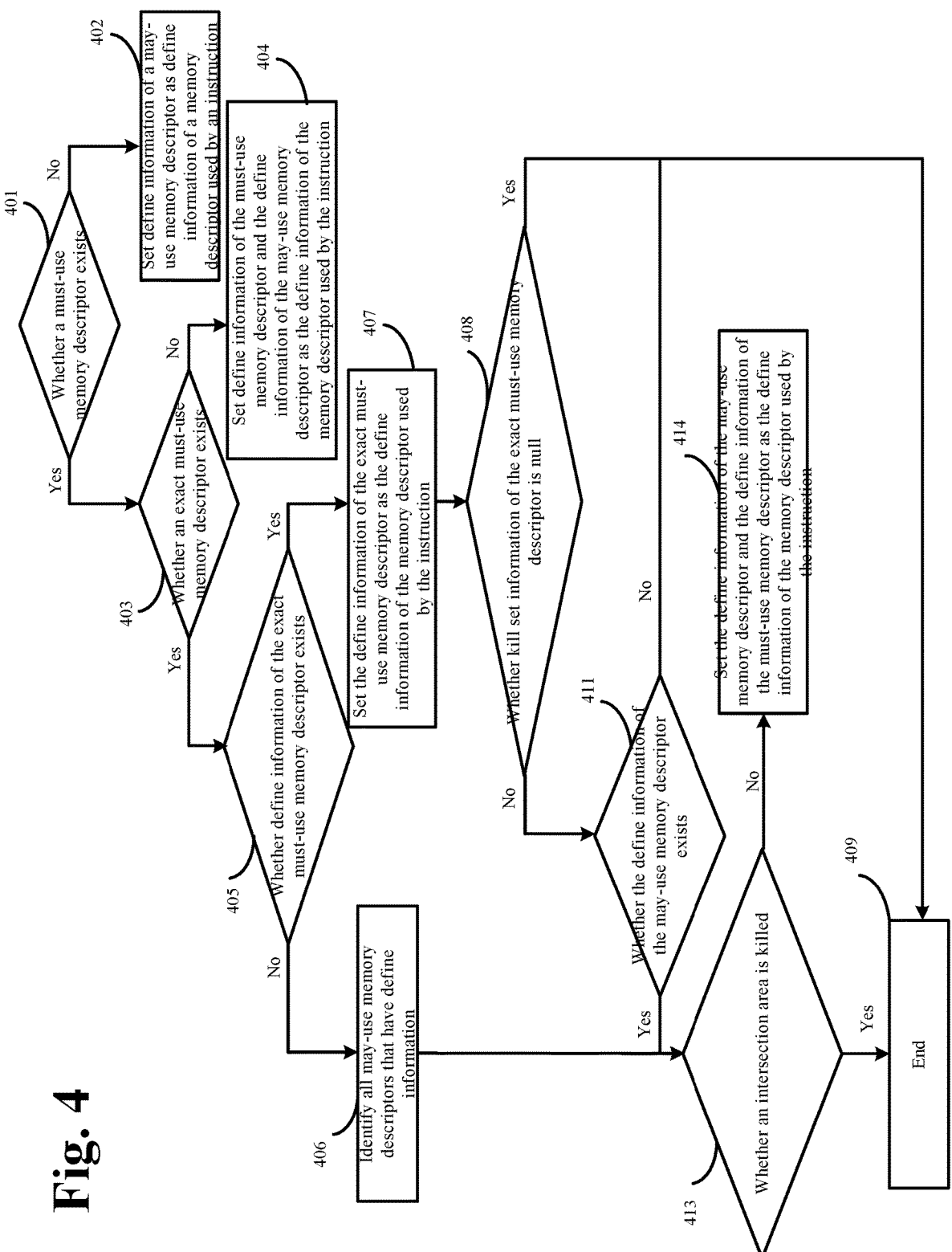
FIG. 4 is a flowchart according to an embodiment of the present disclosure.

Another embodiment of the present disclosure shows a method for computing and updating define information and kill set information of a memory descriptor used by an instruction. FIG. 4 shows a flowchart of the method.

In a step 401, whether a must-use memory descriptor exists in the memory descriptor used by the instruction is judged. If the must-use memory descriptor does not exist, a step 402 is performed to set define information of a may-use memory descriptor as the define information of the memory descriptor used by the instruction. The may-use memory descriptor may be either a plurality of memory descriptors corresponding to a same variable or a descriptor corresponding to a plurality of different variables. If the must-use memory descriptor exists, a step 403 is performed to judge whether an exact must-use memory descriptor exists. In other words, whether the must-use memory descriptor is exact is judged. If the must-use memory descriptor is not exact, a step 404 is performed to set define information of the must-use memory descriptor and the define information of the may-use memory descriptor as the define information of the memory descriptor used by the instruction. In other words, both the define information of the must-use memory descriptor and the define information of the may-use memory descriptor are used as the define information of the memory descriptor used by the instruction. If the must-use memory descriptor is exact, a step 405 is performed.

In the step 405, whether define information of the exact must-use memory descriptor exists is judged. If the define information of the exact must-use memory descriptor does not exist, a step 406 is performed to identify all may-use memory descriptors that have define information, and then a step 413 is performed. If the define information of the exact must-use memory descriptor exists, a step 407 is performed to set the define information of the exact must-use memory descriptor as the define information of the memory descriptor used by the instruction, and then a step 408 is performed.

In the step 408, whether kill set information of the exact must-use memory descriptor is null is judged, where the kill set may be determined by considering all may-use memory descriptors of a same variable. If the kill set information of the exact must-use memory descriptor is null, it is represented that the define information of the exact must-use memory descriptor is not killed, and a step 409 is performed. At this time, it is not required to set kill set information of the memory descriptor used by the instruction. In other words, the kill set information of the memory descriptor used by the instruction is null, and the entire process ends. If the kill set information of the exact must-use memory descriptor is not null, it is represented that part of the define information of the exact must-use memory descriptor is killed, and a step 411 is performed.

In the step 411, whether define information of a may-use memory descriptor that makes the kill set information not null exists is judged. If the define information of the may-use memory descriptor that makes the kill set information not null does not exist, it is not required to consider the may-use memory descriptor, and define may be performed only based on the define information of the must-use memory descriptor. At this time, the step 409 is performed, and the entire process ends. If the define information of the may-use memory descriptor that makes the kill set information not null exists, a step 413 is performed to judge whether an intersection area between the define information of the must-use memory descriptor and the define information of the may-use memory descriptor is killed. If the intersection area between the define information of the must-use memory descriptor and the define information of the may-use memory descriptor is not killed, a step 414 is performed to set the define information of the may-use memory descriptor and the define information of the must-use memory descriptor as the define information of the memory descriptor used by the instruction. If the intersection area between the define information of the must-use memory descriptor and the define information of the may-use memory descriptor is killed, the step 409 is performed, and the entire process ends.

Figure 5:
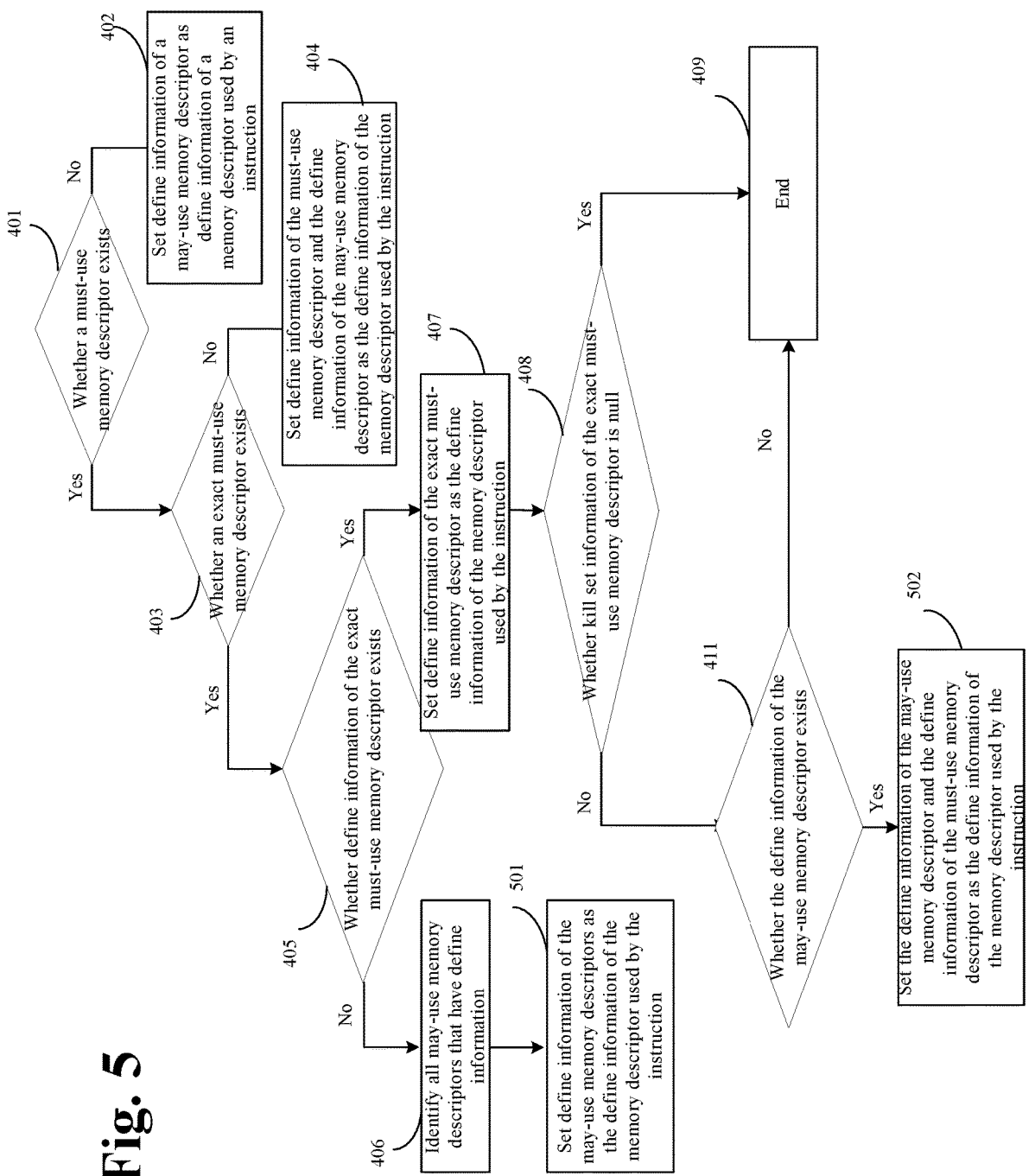
FIG. 5 is a flowchart according to an embodiment of the present disclosure.

Another embodiment of the present disclosure also shows the method for computing and updating the define information and the kill set information of the memory descriptor used by the instruction. FIG. 5 shows a flowchart of this embodiment, which differs from the embodiment of FIG. 4 in two aspects.

One aspect is that the embodiment of FIG. 5 does not include the step 413. In other words, after the step 406, whether the intersection area between the define information of the must-use memory descriptor and the define information of the may-use memory descriptor is killed may not be considered, and a step 501 is performed directly to set the define information of the may-use memory descriptor as the define information of the memory descriptor used by the instruction.

Another aspect is that in the step 411, when it is judged that the define information of the may-use memory descriptor exists, instead of performing the step 413, a step 502 is performed to set the define information of the may-use memory descriptor and the define information of the must-use memory descriptor as the define information of the memory descriptor used by the instruction.

After computing and updating the define information and the kill set information of the memory descriptor used by the instruction, then, the step 304 computes and updates define information and kill set information of a memory descriptor defined by the instruction.

Figure 6:
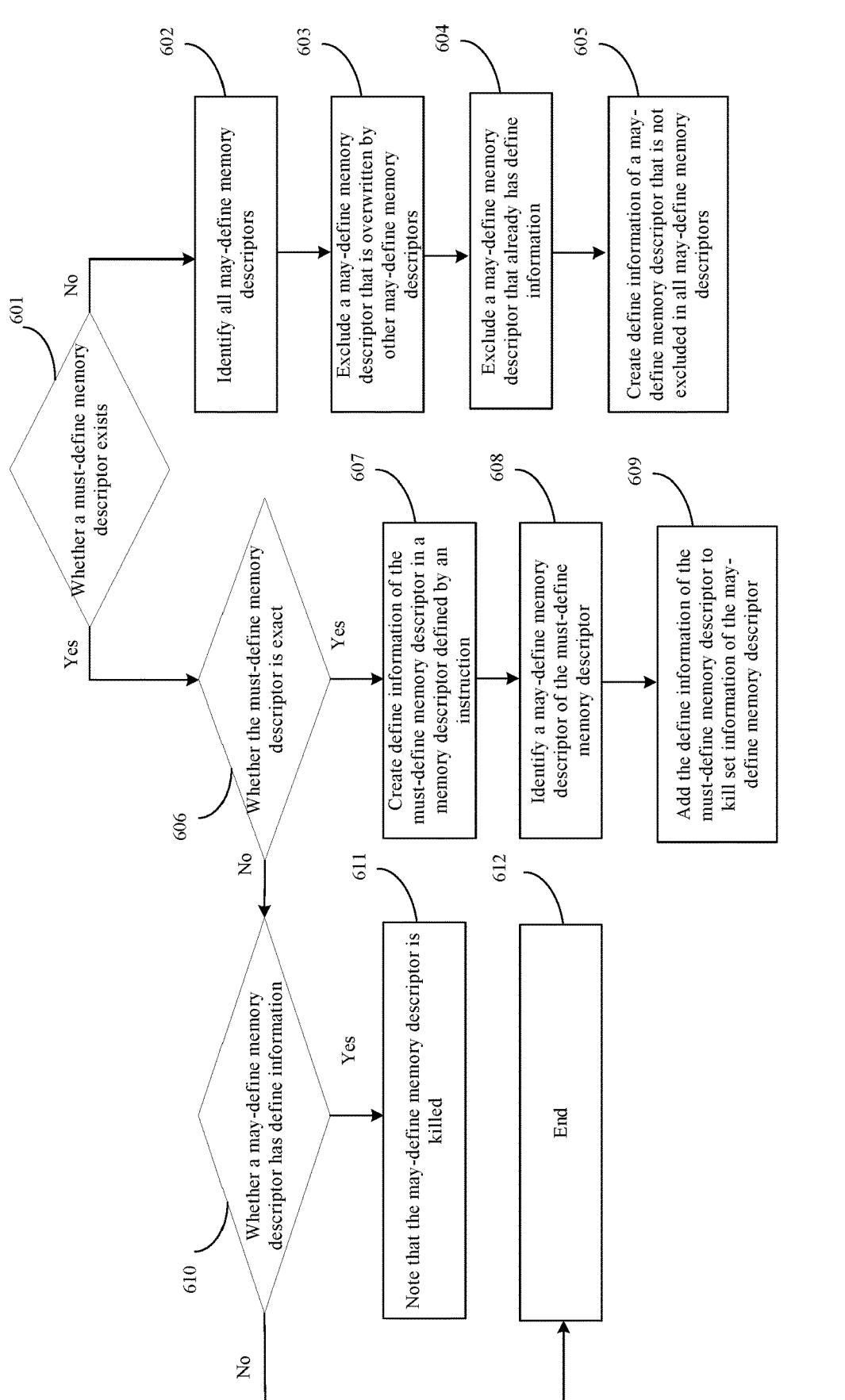
FIG. 6 is a flowchart according to an embodiment of the present disclosure.

Another embodiment of the present disclosure shows a method for computing and updating the define information and the kill set information of the memory descriptor defined by the instruction. FIG. 6 shows a flowchart of the method.

In a step 601, whether a must-define memory descriptor exists in the memory descriptor defined by the instruction is judged. If the must-define memory descriptor does not exist, a step 602 is performed to identify all may-define memory descriptors. Next, a step 603 is performed to exclude a may-define memory descriptor that is overwritten by other may-define memory descriptors among all may-define memory descriptors. Next, a step 604 is performed to exclude a may-define memory descriptor that already has define information among all may-define memory descriptors. Next, a step 605 is performed to create define information of a may-define memory descriptor that is not excluded among all may-define memory descriptors. When it is judged that the must-define memory descriptor exists in the memory descriptor defined by the instruction in the step 601, a step 606 is performed.

In the step 606, whether the must-define memory descriptor is exact is judged. If the must-define memory descriptor is exact, a step 607 is performed to create define information of the must-define memory descriptor in the memory descriptor defined by the instruction. Next, a step 608 is performed to identify a may-define memory descriptor of the must-define memory descriptor in the memory descriptor defined by the instruction. Next, a step 609 is performed to add the define information of the must-define memory descriptor in the memory descriptor defined by the instruction to kill set information of the may-define memory descriptor. When it is judged that the must-define memory descriptor is not exact in the step 606, a step 610 is performed.

In the step 610, whether the may-define memory descriptor has define information is judged. If the may-define memory descriptor has the define information, a step 611 is performed to note that the may-define memory descriptor is killed. If the may-define memory descriptor does not have the define information, it is represented that there is no information available for define, and a step 612 is performed to complete the entire process.

Figure 7:
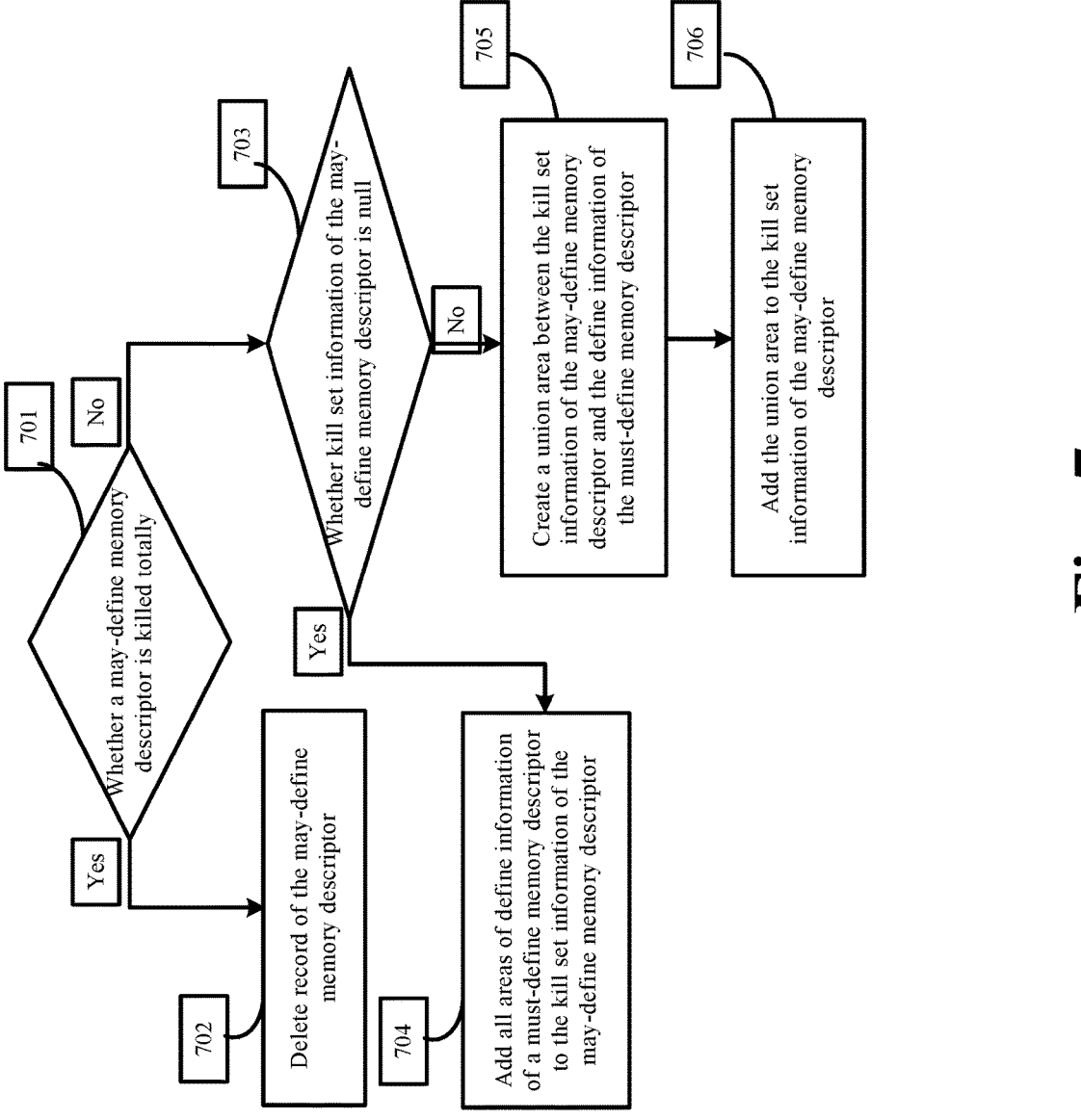
FIG. 7 is a flowchart of adding according to an embodiment of the present disclosure.

In the step 609, a way of adding may be refined as a process shown in FIG. 7. In a step 701, whether a may-define memory descriptor is killed totally is judged. If the may-define memory descriptor is killed totally, a step 702 is performed to delete record of the may-define memory descriptor. If the may-define memory descriptor is not killed totally, a step 703 is performed to judge whether kill set information of the may-define memory descriptor is null. If the kill set information of the may-define memory descriptor is null, a step 704 is performed to add all areas of define information of a must-define memory descriptor in the memory descriptor defined by the instruction to the kill set information of the may-define memory descriptor. If the kill set information of the may-define memory descriptor is not null, a step 705 is performed to create a union area between the kill set information of the may-define memory descriptor and the define information of the must-define memory descriptor. Next, a step 706 is performed to add the union area to the kill set information of the may-define memory descriptor.

In another situation, when whether the must-define memory descriptor exists in the memory descriptor defined by the instruction is judged in the step 601, some special memory descriptors such as the may-define memory descriptor shown in the step 603 or 604 are not excluded. Instead, after all may-define memory descriptors are identified in the step 602, define information of all may-define memory descriptors are created directly.

In another situation, when the must-define memory descriptor is predicated, there is no way to determine whether this predicate will be executed when compiling. Based on the predicate, this embodiment may further perform a process shown in FIG. 8.

In a step 801, whether a must-define memory descriptor of the memory descriptor defined by the instruction is predicated is judged. If the must-define memory descriptor of the memory descriptor defined by the instruction is not predicated, a step 802 is performed to execute a process of FIG. 6. If the must-define memory descriptor of the memory descriptor defined by the instruction is predicated, it is required to create define information of the must-define memory descriptor of the instruction. At this time, a step 803 is performed to judge whether a must-define memory descriptor of the memory descriptor defined by the instruction has define information. If the must-define memory descriptor of the memory descriptor defined by the instruction has the define information, a step 804 is performed to add the memory descriptor defined by the instruction to define information of the must-define memory descriptor of the memory descriptor defined by the instruction. If the must-define memory descriptor of the memory descriptor defined by the instruction does not have the define information, it is required to create new define information of the must-define memory descriptor of the memory descriptor defined by the instruction, and a step 802 is performed to execute the process of FIG. 6.

Simultaneously, in the process of computing and updating the define information and the kill set information of the memory descriptor of the instruction, the step 304 may also update data dependence relationships of instructions at the same time. The data dependence relationships of the instructions may be define information corresponding to a memory descriptor used by each instruction, thereby determining a define-use chain and a use-define chain. The data dependence relationships may be recorded and stored in the form of an array.

For a better understanding of the technical solution of the present disclosure, the foregoing processes will be compared by using examples below.

In an example, a plurality of memory descriptors and define information of the plurality of memory descriptors involved in one variable in a certain control flow graph include MD1 [0, 31], MD2 [0, 15], MD3 [16, 31], MD4 [0, 64]. Moreover, based on data flows in a reverse postorder, there are six related instructions to define and use the variable, as shown in a following table:

| Instruction | Must-define/use | May-define/use |
|---|---|---|
| IR1: define MD1 | MD1 | {MD2, MD3, MD4} |
| IR2: use MD1 | MD1 | {MD2, MD3, MD4} |
| IR3: define MD2 | MD2 | {MD1, MD4} |
| IR4: use MD1 | MD1 | {MD2, MD3, MD4} |
| IR5: define MD3 | MD3 | {MD1, MD4} |
| IR6: use MD4 | MD4 | {MD1, MD2, MD3} |

Each instruction is processed in order. First, an instruction IR1 is processed. The instruction IR1 must define MD1. Since it is the define of the instruction, the process of FIG. 6 is performed. In the step 601, whether a must-define memory descriptor exists in the IR1 is judged. Since MD1 is a must-define memory descriptor, the step 606 is performed to judge whether the must-define memory descriptor is exact. Since an area [0, 31] of MD1 is exact, then, the step 607 is performed to create define information of the must-define memory descriptor in the IR1. In other words, MD1 [0, 31] is set as define information of this variable. Next, the step 608 and the step 609 are performed. Although MD2, MD3, and MD4 are may-define memory descriptors, by querying initial information, it is determined that MD2, MD3, and MD4 do not appear in any instruction before the IR1, and therefore, the may-define memory descriptors including MD2, MD3, and MD4 may not be considered in the memory descriptor defined by this instruction. Therefore, in the step 608 and the step 609, it is not required to record the may-define memory descriptors and update kill set information. Therefore, record information of memory descriptors of this variable is created as follows:

| | Define information | Kill set information |
|---|---|---|
| MD1 | IR1 | { } |

The kill set information is recorded as { }, which represents that the kill set information is null.

Next, an instruction IR2 is processed. The instruction IR2 must use MD1. Since MD1 is the memory descriptor used by the instruction, the process of FIG. 4 or FIG. 5 is performed, and here takes FIG. 4 as an example for explanation. In the step 401, whether the must-use memory descriptor exists in the memory descriptor used by the instruction is judged. Since MD1 exists, the step 403 is performed to judge whether the exact must-use memory descriptor exists. Since MD1 is exact, the step 405 is performed to judge whether the define information of the exact must-use memory descriptor exists. Since define information [0, 31] of MD1 exists, then, the step 407 is performed to set the define information of the exact must-use memory descriptor as the define information of the memory descriptor used by the instruction. Therefore, define information of the memory descriptor used by the instruction IR2 is set as the IR1 (a define instruction of MD1). Next, the step 408 is performed to judge whether the kill set information of the exact must-use memory descriptor is null. Since no area of MD1 has been killed, the step 409 is performed. At this time, it is not required to consider the kill set information, and the entire process ends. In other words, the define information of the IR2 is the IR1. As such, a data dependence relationship (a use_def chain) between the instruction IR2 and the instruction IR1 may be determined, and the kill set information is null.

Next, an instruction IR3 is processed. Since the instruction IR3 must define MD2, the process of FIG. 6 is performed. In the step 601, whether the must-define memory descriptor exists in the IR3 is judged. Since MD2 is a must-define memory descriptor, the step 606 is performed to judge whether the must-define memory descriptor is exact. Since an area [0, 15] of MD2 is exact, then, the step 607 is performed to create define information of the must-define memory descriptor in the IR3. In other words, MD2 [0, 15] is set as define information of this variable. Next, the step 608 and the step 609 are performed. Since MD1 is a may-define memory descriptor of MD2, in the step 609, kill set information of MD1 is updated. Therefore, the record information of the memory descriptors of this variable is updated as follows:

| | Define information | Kill set information |
|---|---|---|
| MD1 | IR1 | {[0, 15]} |
| MD2 | IR3 | { } |

Next, an instruction IR4 is processed. The instruction IR4 must use MD1. In the step 401, whether the must-use memory descriptor exists in the memory descriptor used by the instruction is judged. Since MD1 exists, the step 403 is performed to judge whether the exact must-use memory descriptor exists. Since MD1 is exact, the step 405 is performed to judge whether the define information of the exact must-use memory descriptor exists. Since define information of MD1 exists, then, the step 407 is performed to set the define information of the exact must-use memory descriptor as define information of the memory descriptor used by the instruction IR4. Therefore, the define information of the memory descriptor used by the instruction IR4 is set as the IR1. Next, the step 408 is performed to judge whether the kill set information of the exact must-use memory descriptor is null. After processing the IR3, the kill set information of MD1 is not null, and the step 411 is performed to judge whether the define information of the may-use memory descriptor exists. Since MD2 has define information, the step 413 is performed to judge an intersection area [0, 15] between the define information of MD1 and the define information of MD2 is killed. Since an area [0, 15] of MD2 is not killed, the step 414 is performed to set the define information of MD2 as the define information of the memory descriptor used by the instruction. Therefore, define information of the IR4 includes: IR1 (a define instruction of MD1) and IR3 (a define instruction of MD2). As such, a data dependence relationship (a use_def chain) among the instruction IR4, the instruction IR2, and the instruction IR1 may be determined. In other words, the IR4 uses MD1, while an area of MD1 is defined by two instructions, where [16, 31] is defined by the IR1, and [0, 15] is defined by the IR3.

Next, an instruction IRS is processed. Since the instruction IRS must define MD3, the process of FIG. 6 is performed. In the step 601, whether the must-define memory descriptor exists in the IRS is judged. Since MD3 is a must-define memory descriptor, the step 606 is performed to judge whether the must-define memory descriptor is exact. Since MD3 is exact, then, the step 607 is performed to create define information of the must-define memory descriptor in the IRS. In other words, MD3 is set as define information of the memory descriptor of this variable. Next, the step 608 and the step 609 are performed. Since MD1 is a may-define memory descriptor of MD3, in the step 609, the kill set information of MD1 is updated. Since an original kill area of MD1 is [0, 15] and a new kill area is [16, 31], these two areas are merged into a new area [0, 31]. This area is exactly a complete area corresponding to MD1. In other words, the define of MD1 has been killed totally. Therefore, record of this variable is updated as follows:

| | Define information | Kill set information |
|---|---|---|
| MD2 | IR3 | { } |
| MD3 | IR5 | { } |

Next, an instruction IR6 is processed. The instruction IR6 must use MD4. In the step 401, whether the must-use memory descriptor exists in the memory descriptor used by the instruction is judged. Since MD4 has not been defined in the preceding instructions, there is no must-use memory descriptor. Therefore, the step 402 is performed to set the define information of the may-use memory descriptor as the define information of the memory descriptor used by the instruction. When all may-use memory descriptors are considered, only MD2 and MD3 are present in the record, and valid areas of both two memory descriptors are not killed, and therefore, define information (including IR3 and IR5) of these two memory descriptors are used as define information of the IR6. As such, a data dependence relationship (a use_def chain) among the instruction IR6, the instruction IR3, and the instruction IR5 may be determined.

In another example, it is assumed that there are four memory descriptors, which are MD1 [0, 31], MD2 [0, X], MD3 [0, 31], and MD4 [0, 63], respectively, where X represents a specific address whose corresponding memory area may not be determined when compiling. MD1 and MD2 describe a same variable, such as a variable A. MD3 and MD4 describe a same variable, such as a variable B. Instructions for the four memory descriptors are described below:

| Instruction | Must-define/use | May-define/use |
|---|---|---|
| IR1: define MD1 | MD1 | {MD2} |
| IR2: define MD2 | MD2 | {MD1} |
| IR3: use MD2 | MD2 | {MD1} |
| IR4: define | | {MD1, MD2, MD3, MD4} |
| IR5: define MD1 | MD1 (predicated) | {MD2} |
| IR6: use | | {MD1, MD2, MD3, MD4} |

First, the instruction IR1 is processed. The instruction IR1 must define MD1. Since it is the define of the instruction, the process of FIG. 6 is performed. In the step 601, whether the must-define memory descriptor exists in the IR1 is judged. Since MD1 is the must-define memory descriptor, the step 606 is performed to judge whether the must-define memory descriptor is exact. Since MD1 is exact, then, the step 607 is performed to create the define information of the must-define memory descriptor in the IR1. In other words, MD1 [0, 31] is set as define information of the variable A. Next, the step 608 and the step 609 are performed. Although the define of MD2 may affect the define information of MD1, while MD2 has not been defined in any instruction before the IR1, and therefore, the may-define memory descriptor MD2 may not be considered in this instruction. Therefore, in the step 608 and the step 609, it is not required to record the may-define memory descriptor and update the kill set information. Therefore, record information of memory descriptors of the variable A is created as follows:

| | Define information | Kill set information | Is_kill |
|---|---|---|---|
| MD1 | IR1 | { } | False |

Is_kill records whether the memory descriptor is killed. If is_kill is true, it is represented that the memory descriptor is killed. If is_kill is false, it is represented that the memory descriptor is not killed.

Next, the instruction IR2 is processed. The instruction IR2 must define MD2. In the step 601, whether the must-define memory descriptor exists in the IR2 is judged. Since MD2 is the must-define memory descriptor, the step 606 is performed to judge whether the must-define memory descriptor is exact. Since MD2 is not exact, where X is not defined, in the step 610, whether the may-define memory descriptor has the define information is judged. Since the may-define memory descriptor MD1 of the IR2 has the define information, the step 611 is performed to note that MD1 is killed. In other words, is_kill of MD1 is changed to true, which represents that part of the area of MD1 is killed. However, since the define information of MD2 is not exact, the kill set information of MD1 may not be determined, and therefore, is_kill is used to represent that MD1 is killed. Therefore, record of the memory descriptors of the variable A is updated as follows:

| | Define information | Kill set information | Is_kill |
|---|---|---|---|
| MD1 | IR1 | { } | True |
| MD2 | IR2 | { } | False |

Next, the instruction IR3 is processed. The instruction IR3 must use MD2. In the step 401, whether the must-use memory descriptor exists in the memory descriptor used by the instruction is judged. Since MD2 is the must-use memory descriptor, the step 403 is performed to judge whether the exact must-use memory descriptor exists. Since MD2 is not exact, then, the step 404 is performed to set the define information of the must-use memory descriptor and the define information of the may-use memory descriptor as the define information of the memory descriptor used by the instruction. In other words, both the define information of MD2 and the define information of MD1 are used as the define information of the IR3. The define information used by the IR3 for MD2 includes the IR1 and the IR2. As such, a data dependence relationship (a use_def chain) among the instruction IR3, the instruction IR2, and the instruction IR1 may be determined.

Next, the instruction IR4 is processed. The instruction IR4 is the define of the instruction. In the step 601, whether the must-define memory descriptor exists in the instruction is judged. Since the must-define memory descriptor does not exist, the step 602 is performed to identify all may-define memory descriptors. In this example, all may-define memory descriptors are MD1, MD2, MD3, and MD4. Next, the step 603 is performed to exclude the may-define memory descriptor that is overwritten by other may-define memory descriptors among all may-define memory descriptors. Since MD3 is totally overwritten by MD4, MD3 is excluded. Next, the step 604 is performed to exclude the may-define memory descriptor that already has the define information among all may-define memory descriptors. Since both MD1 and MD2 already have the define information, both MD1 and MD2 are excluded. Therefore, only MD4 is left. Next, the step 605 is performed to create the define information of the may-define memory descriptor that is not excluded among all may-define memory descriptors. In other words, define information of MD4 corresponding to the variable B is added. The define information of each memory descriptor after updating is as follows:

| | Define information | Kill set information | Is_kill |
|---|---|---|---|
| MD1 | IR1 | { } | True |
| MD2 | IR2 | { } | False |
| MD4 | IR4 | { } | False |

Figure 8:
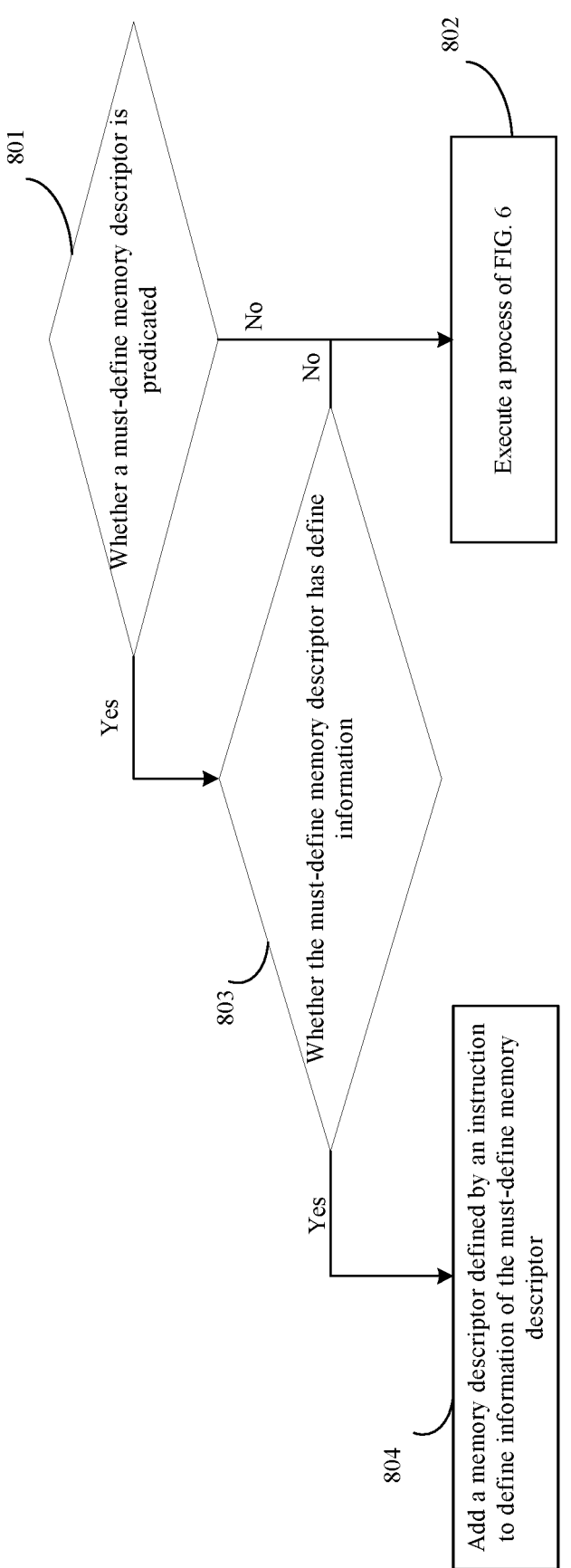
FIG. 8 is a flowchart according to an embodiment of the present disclosure.

Next, the instruction IR5 is processed. The instruction IR5 must define MD1. Since the IRS is predicated, the process shown in FIG. 8 is performed. In the step 801, whether the must-define memory descriptor of the memory descriptor defined by the instruction is predicated is judged. Since the must-define memory descriptor of the memory descriptor defined by the instruction is predicated, the step 803 is performed to judge whether the must-define memory descriptor of the memory descriptor defined by the instruction has the define information. Since MD1 has the define information, the step 804 is performed to add the memory descriptor defined by the instruction to the define information of the must-define memory descriptor of the memory descriptor defined by the instruction. Therefore, define record is updated as follows:

| | Define information | Kill set information | Is_kill |
|---|---|---|---|
| MD1 | IR1, IR5 | { } | True |
| MD2 | IR2 | { } | False |
| MD4 | IR4 | { } | False |

Next, the instruction IR6 is processed. The instruction IR6 is the use of the instruction. In the step 401, whether the must-use memory descriptor exists in the memory descriptor used by the instruction is judged. Since the must-use memory descriptor does not exist, the step 402 is performed to set the define information of the may-use memory descriptor as the define information of the memory descriptor used by the instruction IR6. The define information used in the IR6 includes: IR1, IR2, IR4, and IR5. As such, a data dependence relationship (a use_def chain) among the instruction IR6 and the instruction IR2, the instruction IR1, the instruction IR4, and the instruction IR5 may be determined.

Another embodiment of the present disclosure shows a computer readable storage medium, on which computer program codes for computing data dependence relationships in a program are stored. When the computer program codes are run by a processor, various methods of the present disclosure, such as methods described in FIGS. 3-8, are performed.

In the above embodiments, a compiler analyzes a memory area and kill set information of each define and use of the instruction and computes data dependence relationships between instructions. Simultaneously, for an instruction that has define-use relationships, by creating define-use chains and use-define chains, the above embodiments solve the technical problem that it is difficult to analyze data dependence relationships between memories, resulting in a waste of computing resources, and achieve the technical effect of improving computing efficiency.

The compiler may perform compilation optimization based on the data dependence relationships, thereby effectively decreasing unnecessary computing programs and obtaining optimized codes. The compiler may further convert the optimized codes into machine codes. The machine codes may be executed by an artificial intelligence chip. As such, the operation of the artificial intelligence chip, especially neural network inference, may be accelerated.

Figure 9:
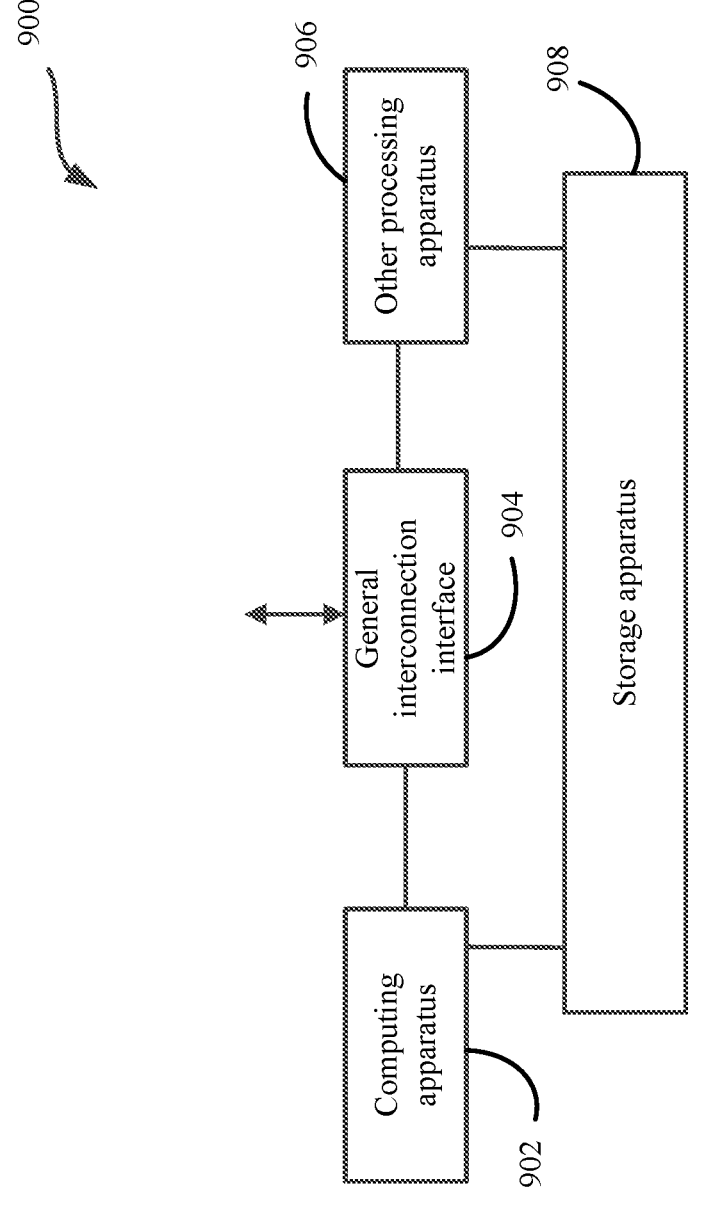
FIG. 9 is a structural diagram of an integrated circuit apparatus according to an embodiment of the present disclosure.

FIG. 9 shows a structural diagram of an integrated circuit apparatus 900 according to an embodiment of the present disclosure. As shown in FIG. 9, the integrated circuit apparatus 900 includes a computing apparatus 902. The computing apparatus 902 is configured with compiled machine codes according to embodiments of the present disclosure, so as to implement neural network inference. Additionally, the integrated circuit apparatus 900 further includes a general interconnection interface 904 and other processing apparatus 906.

Other processing apparatus 906 may be one or more of general and/or dedicated processors such as a central processing unit, a graphics processing unit, an artificial intelligence processor, and the like. The number of other processing apparatus is not limited but determined according to actual requirements. Other processing apparatus 906 serves as an interface between the computing apparatus 902 and external data and controls. Other processing apparatus performs operations that include but are not limited to data moving and completes basic controls such as starting and stopping the computing apparatus 902. Other processing apparatus 906 may also cooperate with the computing apparatus 902 to jointly complete an operation task.

The general interconnection interface 904 may be used to transfer data and control instructions between the computing apparatus 902 and other processing apparatus 906. For example, the computing apparatus 902 may acquire required input data from other processing apparatus 906 via the general interconnection interface 904 and write the input data to an on-chip storage unit of the computing apparatus 902. Further, the computing apparatus 902 may acquire the control instructions from other processing apparatus 906 via the general interconnection interface 904 and write the control instructions to an on-chip control cache of the computing apparatus 902. Alternatively or optionally, the general interconnection interface 904 may also read data in the storage unit of the computing apparatus 902 and then transfer the data to other processing apparatus 906.

The integrated circuit apparatus 900 further includes a storage apparatus 908. The storage apparatus 908 may be connected to the computing apparatus 902 and other processing apparatus 906, respectively. The storage apparatus 908 is used to store data of the computing apparatus 902 and other processing apparatus 906. The storage apparatus 908 is especially suitable for storing data that may not be entirely stored in an internal memory of the computing apparatus 902 or other processing apparatus 906.

According to different application scenarios, the integrated circuit apparatus 900 may be used as a system on chip (SOC) of a device including a mobile phone, a robot, a drone, a video-capture device, and the like. As such, a core area of a control part may be reduced effectively, processing speed may be improved, and overall power consumption may be reduced. In this situation, the general interconnection interface 904 of the integrated circuit apparatus 900 is connected to some components of the device. Here, the components may be, for example, a camera, a monitor, a mouse, a keyboard, a network card, or a WIFI interface.

The present disclosure also discloses a chip or an integrated circuit chip, including the integrated circuit apparatus 900. The present disclosure also discloses a chip package structure, including the chip.

Figure 10:
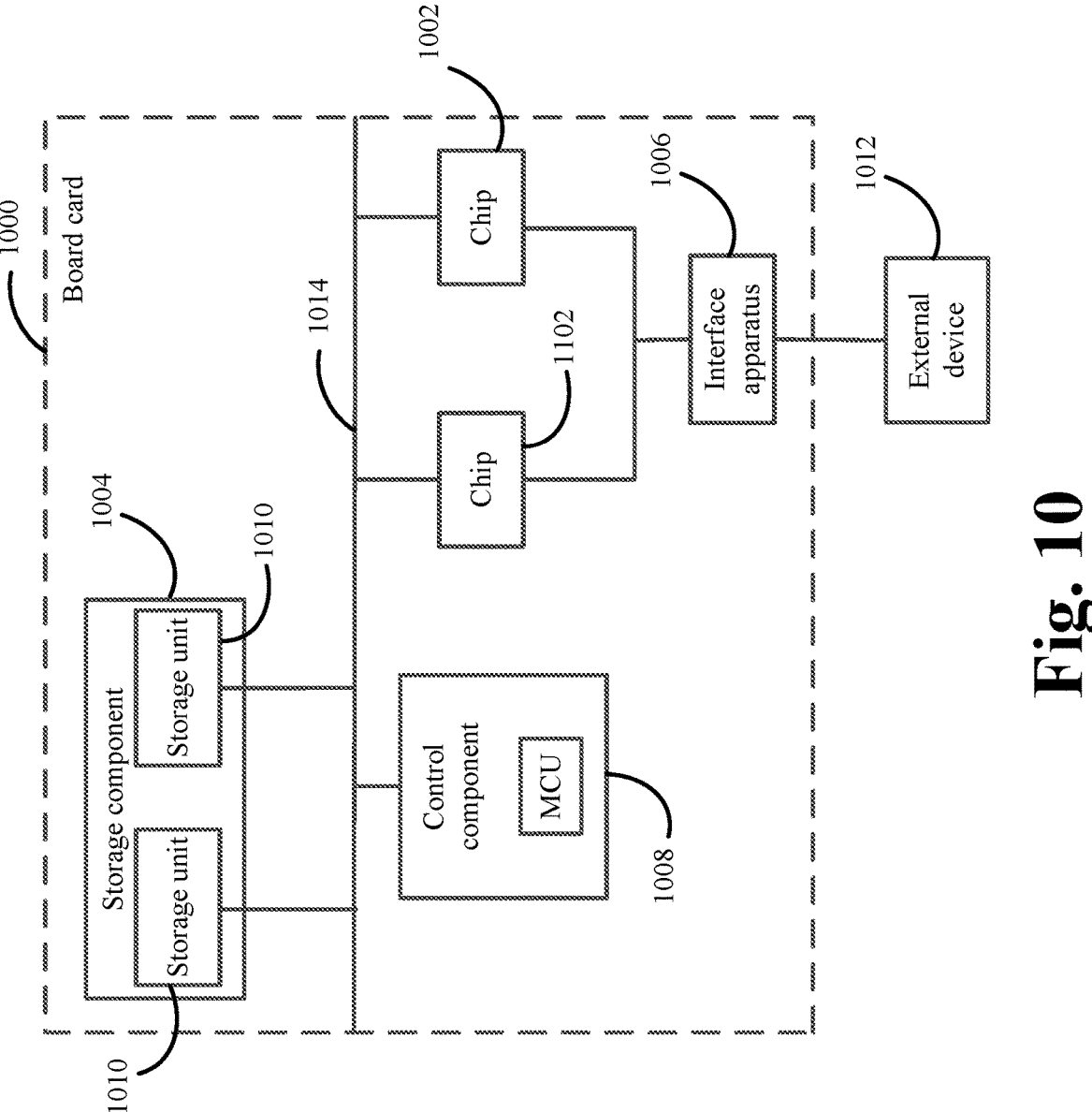
FIG. 10 is a structural diagram of a board card according to an embodiment of the present disclosure.

Another embodiment of the present disclosure shows a board card, including the chip package structure. Referring to FIG. 10, in addition to the aforementioned plurality of chips 1002, a board card 1000 may further include other matching components. The matching components include a storage component 1004, an interface apparatus 1006, and a control component 1008.

The storage component 1004 is connected to the chip 1002 in the chip package structure via a bus 1014. The storage component 1004 is used for storing data. The storage component 1004 may include a plurality of groups of storage units 1010.

The interface apparatus 1006 is electrically connected to the chip 1002 in the chip package structure. The interface apparatus 1006 is used to implement data transfer between the chip 1002 and an external device 1012 (such as a server or a computer). In this embodiment, the interface apparatus 1006 is a standard peripheral component interconnect express (PCIe) interface, and to-be-processed data is transferred from the server to the chip 1002 through the standard PCIe interface to implement data transfer. A computing result of the chip 1002 is still sent back to the external device 1012 through the interface apparatus 1006.

The control component 1008 is electrically connected to the chip 1002, so as to monitor a state of the chip 1002. Specifically, the chip 1002 is electrically connected to the control component 1008 through a serial peripheral interface (SPI). The control component 1008 may include a micro controller unit (MCU).

Another embodiment of the present disclosure shows an electronic device or apparatus, including the board card 1000. According to different application scenarios, the electronic device or apparatus may include a data processing apparatus, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical device. The vehicle may include an airplane, a ship, and/or a car; the household appliance may include a television, an air conditioner, a microwave oven, a refrigerator, an electric rice cooker, a humidifier, a washing machine, an electric lamp, a gas cooker, and a range hood; and the medical device may include a nuclear magnetic resonance spectrometer, a B-ultrasonic scanner, and/or an electrocardiograph.

The foregoing may be better understood according to following articles:

Article A1. A method for computing data dependence relationships in a program, including: constructing the program into a control flow graph in a static single assignment form, where the control flow graph includes a plurality of nodes; setting initial information of memory descriptors of the plurality of nodes, where the initial information includes define information and kill set information of all memory descriptors of immediate dominators; and iterating based on the control flow graph, where each iteration performs following steps: traversing the plurality of nodes, computing and updating define information and kill set information of a memory descriptor of each node, and updating data dependence relationships of instructions, where the data dependence relationships of the instructions are used as reference information for instruction compilation optimization.

Article A2. The method of article A1, where the iterating is performed in a reverse postorder of data flows.

Article A3. The method of article A1, where the computing includes computing and updating a memory descriptor used by an instruction first, and then computing and updating a memory descriptor defined by the instruction.

Article A4. The method of article A3, where, for the memory descriptor used by the instruction, the computing further includes: judging whether an exact must-use memory descriptor exists; judging whether define information of the exact must-use memory descriptor exists if the exact must-use memory descriptor exists; and setting the define information of the exact must-use memory descriptor as define information of the memory descriptor used by the instruction if the define information of the exact must-use memory descriptor exists.

Article A5. The method of article A4, where, if the define information of the exact must-use memory descriptor exists, the computing further includes: judging whether kill set information of the exact must-use memory descriptor is null; judging whether define information of a may-use memory descriptor exists if the kill set information of the exact must-use memory descriptor is not null; judging whether an intersection area between define information of a must-use memory descriptor and the define information of the may-use memory descriptor is killed if the define information of the may-use memory descriptor exists; and setting the define information of the may-use memory descriptor and the define information of the must-use memory descriptor as the define information of the memory descriptor used by the instruction if the intersection area between the define information of the must-use memory descriptor and the define information of the may-use memory descriptor is not killed.

Article A6. The method of article A4, where, if the define information of the exact must-use memory descriptor exists, the computing further includes: judging whether kill set information of the exact must-use memory descriptor is null; judging whether define information of a may-use memory descriptor exists if the kill set information of the exact must-use memory descriptor is not null; and setting the define information of the may-use memory descriptor and define information of a must-use memory descriptor as the define information of the memory descriptor used by the instruction if the define information of the may-use memory descriptor exists.

Article A7. The method of article A4, where, if the define information of the exact must-use memory descriptor does not exist, the computing further includes: identifying all may-use memory descriptors that have define information; judging whether an intersection area between the define information of the exact must-use memory descriptor and define information of the may-use memory descriptors is killed; and setting the define information of the may-use memory descriptors and define information of a must-use memory descriptor as the define information of the memory descriptor used by the instruction if the intersection area between the define information of the exact must-use memory descriptor and the define information of the may-use memory descriptors is not killed.

Article A8. The method of article A4, where, if the define information of the exact must-use memory descriptor does not exist, the computing further includes: identifying all may-use memory descriptors that have define information; and setting define information of the may-use memory descriptors as the define information of the memory descriptor used by the instruction.

Article A9. The method of article A4, where, if the exact must-use memory descriptor does not exist, the computing further includes: setting define information of a must-use memory descriptor and define information of a may-use memory descriptor as the define information of the memory descriptor used by the instruction.

Article A10. The method of article A4, where the computing further includes: judging whether a must-use memory descriptor exists in the memory descriptor used by the instruction; and setting define information of a may-use memory descriptor as the define information of the memory descriptor used by the instruction if the must-use memory descriptor does not exist.

Article A11. The method of article A3, where, for the memory descriptor defined by the instruction, the computing includes: creating define information of a must-define memory descriptor in the memory descriptor defined by the instruction; identifying a may-define memory descriptor of the must-define memory descriptor in the memory descriptor defined by the instruction; and adding the define information of the must-define memory descriptor in the instruction to kill set information of the may-define memory descriptor.

Article A12. The method of article A11, where the adding includes: judging whether the may-define memory descriptor is killed totally; and deleting record of the may-define memory descriptor if the may-define memory descriptor is killed totally.

Article A13. The method of article A11, where the adding includes: judging whether the kill set information of the may-define memory descriptor is null; and adding all areas of the define information of the must-define memory descriptor in the memory descriptor defined by the instruction to the kill set information of the may-define memory descriptor if the kill set information of the may-define memory descriptor is null.

Article A14. The method of article A13, where, if the kill set information of the may-define memory descriptor is not null, the adding includes: creating a union area between the kill set information of the may-define memory descriptor and the define information of the must-define memory descriptor; and adding the union area to the kill set information of the may-define memory descriptor.

Article A15. The method of article A3, where, for the memory descriptor defined by the instruction, the computing includes: judging whether a must-define memory descriptor in the memory descriptor defined by the instruction is exact; if the must-define memory descriptor in the memory descriptor defined by the instruction is exact: creating define information of the must-define memory descriptor in the memory descriptor defined by the instruction; and identifying a may-define memory descriptor of the must-define memory descriptor in the memory descriptor defined by the instruction; and if the must-define memory descriptor in the memory descriptor defined by the instruction is not exact: judging whether the may-define memory descriptor has define information; and noting that the may-define memory descriptor is killed if the may-define memory descriptor has the define information.

Article A16. The method of article A3, where, for the memory descriptor defined by the instruction, the computing includes: judging whether a must-define memory descriptor exists in the memory descriptor defined by the instruction; and performing following steps if the must-define memory descriptor does not exist in the memory descriptor defined by the instruction: identifying all may-define memory descriptors; excluding a may-define memory descriptor that is overwritten by other may-define memory descriptors in all may-define memory descriptors; excluding a may-define memory descriptor that already has define information in all may-define memory descriptors; and creating define information of a may-define memory descriptor that is not excluded in all may-define memory descriptors.

Article A17. The method of article A3, where, for the memory descriptor defined by the instruction, the computing includes: judging whether a must-define memory descriptor exists in the memory descriptor defined by the instruction; and creating define information of all may-define memory descriptors if the must-define memory descriptor does not exist in the memory descriptor defined by the instruction.

Article A18. The method of article A3, where, for the memory descriptor defined by the instruction, the computing includes: judging whether a must-define memory descriptor of the memory descriptor defined by the instruction is predicated; and creating define information of the must-define memory descriptor of the memory descriptor defined by the instruction if the must-define memory descriptor of the memory descriptor defined by the instruction is predicated.

Article A19. The method of article A18, where creating the define information of the must-define memory descriptor of the memory descriptor defined by the instruction includes: judging whether the must-define memory descriptor of the memory descriptor defined by the instruction has define information; adding the memory descriptor defined by the instruction to the define information of the must-define memory descriptor of the memory descriptor defined by the instruction if the must-define memory descriptor of the memory descriptor defined by the instruction has the define information; and creating new define information of the must-define memory descriptor of the memory descriptor defined by the instruction if the must-define memory descriptor of the memory descriptor defined by the instruction does not have the define information.

Article A20. The method of article A1, where the computing includes: traversing an instruction of each basic block, and judging whether a successor basic block of each basic block is a PHI node; and performing following steps if the successor basic block of each basic block is the PHI node: setting define information of each basic block as define information of a memory descriptor of the PHI node; creating an intersection area of kill set information of all basic blocks; and setting the intersection area as kill set information of the PHI node.

Article A21. The method of article A1, further including: identifying immediate dominators in the plurality of nodes.

Article A22. The method of any one of articles A1-21, where the kill set information is an ordered list.

Article A23. A computer readable storage medium, on which computer program codes for computing data dependence relationships in a program are stored, where, when the computer program codes are run by a processor, the method of any one of articles A1-A22 is performed.

The embodiments of the present disclosure are described in detail above. The present disclosure explains principles and implementations of the present disclosure with specific examples. Descriptions of the embodiments above are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure.

What is claimed:

1. A computer-implemented method for computing data dependence relationships of instructions, the computer-implemented method comprising:

constructing, by a processor, a control flow graph in a static single assignment form, wherein the control flow graph is an abstract data structure, the control flow graph comprises a plurality of nodes, and in the static single assignment form, each variable is assigned a value only once;

identifying, by the processor, immediate dominators of the plurality of nodes based on Lengauer-Tarjan algorithm;

setting initial information of memory descriptors of the plurality of nodes, wherein the initial information comprises define information and kill set information of all memory descriptors of the immediate dominators, wherein the kill set information is an ordered list arranged in an order from a low address to a high address, so as to execute various intersection and union operations; and iterating, by the processor, based on the control flow graph, wherein each iteration performs the following steps:

traversing the plurality of nodes, computing and updating define information and kill set information of a memory descriptor, of the memory descriptors, of each node of the plurality of nodes, updating the data dependence relationships of the instructions, wherein the data dependence relationships of the instructions are used as reference information for instruction compilation optimization, and performing the instruction compilation optimization based on the data dependence relationships of the instructions, wherein the instructions after compilation optimization are compiled into machine codes, wherein the computing further includes computing and updating a memory descriptor, of the memory descriptors, used by an instruction of the instructions first, and then computing and updating a memory descriptor, of the memory descriptors, defined by the instruction, wherein, for the memory descriptor used by the instruction, the computing further comprises:

determining whether an exact must-use memory descriptor exists;

determining whether define information of the exact must-use memory descriptor exists in a case where the exact must-use memory descriptor exists; and in a case where the define information of the exact must-use memory descriptor exists, the computing further comprises:

determining whether kill set information of the exact must-use memory descriptor is null;

determining whether define information of a may-use memory descriptor exists in a case where the kill set information of the exact must-use memory descriptor is not null; and setting the define information of the may-use memory descriptor and define information of a must-use memory descriptor as define information of the memory descriptor used by the instruction in a case where the define information of the may-use memory descriptor exists.

2. The computer-implemented method of claim 1, wherein, in a case where the define information of the exact must-use memory descriptor exists, the computing further comprises:

determining whether an intersection area between the define information of the must-use memory descriptor and the define information of the may-use memory descriptor is killed in a case where the define information of the may-use memory descriptor exists; and setting the define information of the may-use memory descriptor and the define information of the must-use memory descriptor as the define information of the memory descriptor used by the instruction in a case where the intersection area between the define information of the must-use memory descriptor and the define information of the may-use memory descriptor is not killed.

3. The computer-implemented method of claim 1, wherein, in a case where the define information of the exact must-use memory descriptor does not exist, the computing further comprises:

identifying all may-use memory descriptors that have define information;

determining whether an intersection area between the define information of the exact must-use memory descriptor and define information of the may-use memory descriptors is killed; and setting the define information of the may-use memory descriptors and the define information of the must-use memory descriptor as the define information of the memory descriptor used by the instruction in a case where the intersection area between the define information of the exact must-use memory descriptor and the define information of the may-use memory descriptors is not killed.

4. The computer-implemented method of claim 1, wherein, in a case where the define information of the exact must-use memory descriptor does not exist, the computing further comprises:

identifying all may-use memory descriptors that have define information; and setting define information of the may-use memory descriptors as the define information of the memory descriptor used by the instruction.

5. The computer-implemented method of claim 1, wherein, in a case where the exact must-use memory descriptor does not exist, the computing further comprises:

setting the define information of the must-use memory descriptor and the define information of the may-use memory descriptor as the define information of the memory descriptor used by the instruction.

6. The computer-implemented method of claim 1, wherein the computing further comprises:

determining whether the must-use memory descriptor exists in the memory descriptor used by the instruction; and setting the define information of the may-use memory descriptor as the define information of the memory descriptor used by the instruction in a case where the must-use memory descriptor does not exist.

7. The computer-implemented method of claim 1, wherein, for the memory descriptor defined by the instruction, the computing comprises:

creating define information of a must-define memory descriptor in the memory descriptor defined by the instruction;

identifying a may-define memory descriptor of the must-define memory descriptor in the memory descriptor defined by the instruction; and adding the define information of the must-define memory descriptor in the instruction to kill set information of the may-define memory descriptor.

8. The computer-implemented method of claim 7, wherein the adding comprises:

determining whether the may-define memory descriptor is killed totally;

deleting a record of the may-define memory descriptor in a case where the may-define memory descriptor is killed totally;

determining whether the kill set information of the may-define memory descriptor is null; and adding all areas of the define information of the must-define memory descriptor in the memory descriptor defined by the instruction to the kill set information of the may-define memory descriptor in a case where the kill set information of the may-define memory descriptor is null, wherein, in a case where the kill set information of the may-define memory descriptor is not null, the adding comprises:

creating a union area between the kill set information of the may-define memory descriptor and the define information of the must-define memory descriptor; and adding the union area to the kill set information of the may-define memory descriptor.

9. The computer-implemented method of claim 1, wherein, for the memory descriptor defined by the instruction, the computing further comprises:

determining whether a must-define memory descriptor in the memory descriptor defined by the instruction is exact;

in a case where the must-define memory descriptor in the memory descriptor defined by the instruction is exact:

creating define information of the must-define memory descriptor in the memory descriptor defined by the instruction; and identifying a may-define memory descriptor of the must-define memory descriptor in the memory descriptor defined by the instruction; and in a case where the must-define memory descriptor in the memory descriptor defined by the instruction is not exact:

determining whether the may-define memory descriptor has define information; and noting that the may-define memory descriptor is killed in a case where the may-define memory descriptor has the define information.

10. The computer-implemented method of claim 1, wherein, for the memory descriptor defined by the instruction, the computing comprises:

determining whether a must-define memory descriptor exists in the memory descriptor defined by the instruction; and performing the following steps in a case where the must-define memory descriptor does not exist in the memory descriptor defined by the instruction:

identifying all may-define memory descriptors;

excluding a may-define memory descriptor that is overwritten by other may-define memory descriptors in the all may-define memory descriptors;

excluding a may-define memory descriptor that already has define information in the all may-define memory descriptors; and creating define information of a may-define memory descriptor that is not excluded in the all may-define memory descriptors.

11. The computer-implemented method of claim 1, wherein, for the memory descriptor defined by the instruction, the computing comprises:

determining whether a must-define memory descriptor exists in the memory descriptor defined by the instruction; and creating define information of all may-define memory descriptors in a case where the must- define memory descriptor does not exist in the memory descriptor defined by the instruction.

12. The computer-implemented method of claim 1, wherein, for the memory descriptor defined by the instruction, the computing comprises:

determining whether a must-define memory descriptor of the memory descriptor defined by the instruction is predicated; and creating define information of the must-define memory descriptor of the memory descriptor defined by the instruction in a case where the must-define memory descriptor of the memory descriptor defined by the instruction is predicated.

13. The computer-implemented method of claim 12, wherein creating the define information of the must-define memory descriptor of the memory descriptor defined by the instruction comprises:

determining whether the must-define memory descriptor of the memory descriptor defined by the instruction has the define information;

adding the memory descriptor defined by the instruction to the define information of the must-define memory descriptor of the memory descriptor defined by the instruction in a case where the must-define memory descriptor of the memory descriptor defined by the instruction has the define information; and creating new define information of the must-define memory descriptor of the memory descriptor defined by the instruction in a case where the must-define memory descriptor of the memory descriptor defined by the instruction does not have the define information.

14. The computer-implemented method of claim 1, wherein the computing comprises:

traverse an instruction of each basic block, determine whether a successor basic block of each basic block is a PHI node; and perform the following steps in a case where the successor basic block of each basic block is the PHI node:

setting define information of each basic block as define information of a memory descriptor of the PHI node;

creating an intersection area of kill set information of all basic blocks; and setting the intersection area as kill set information of the PHI node.

15. A non-transitory computer readable medium, having stored thereon computer executable instructions, which when executed by a processor, cause the processor to execute operations, the operations comprising:

constructing a control flow graph in a static single assignment form, wherein the control flow graph is an abstract data structure, the control flow graph comprises a plurality of nodes, and in the static single assignment form, each variable is assigned a value only once;

identifying immediate dominators of the plurality of nodes based on Lengauer-Tarjan algorithm;

setting initial information of memory descriptors of the plurality of nodes, wherein the initial information comprises define information and kill set information of all memory descriptors of immediate dominators, wherein the kill set information is an ordered list arranged in an order from a low address to a high address, so as to execute various intersection and union operations; and iterating based on the control flow graph, wherein each iteration performs the following steps:

traversing the plurality of nodes, computing and updating define information and kill set information of a memory descriptor, of the memory descriptors, of each node of the plurality of nodes, updating data dependence relationships of instructions, wherein the data dependence relationships of the instructions are used as reference information for instruction compilation optimization; and performing the instruction compilation optimization based on the data dependence relationships of the instructions, wherein the instructions after compilation optimization are compiled into machine codes, wherein the computing further includes computing and updating a memory descriptor, of the memory descriptors, used by an instruction of the instructions first, and then computing and updating a memory descriptor, of the memory descriptors, defined by the instruction, wherein, for the memory descriptor used by the instruction, the computing further comprises:

determining whether an exact must-use memory descriptor exists;

determining whether define information of the exact must-use memory descriptor exists in a case where the exact must-use memory descriptor exists; and in a case where the define information of the exact must-use memory descriptor exists, the computing further comprises:

determining whether kill set information of the exact must-use memory descriptor is null;

determining whether define information of a may-use memory descriptor exists in a case where the kill set information of the exact must-use memory descriptor is not null; and setting the define information of the may-use memory descriptor and define information of a must-use memory descriptor as define information of the memory descriptor used by the instruction in a case where the define information of the may-use memory descriptor exists.

* * * * *